United States Patent
Kath et al.

(10) Patent No.: US 7,068,896 B1
(45) Date of Patent: Jun. 27, 2006

(54) METHOD AND SYSTEM FOR THE CONTROLLED PRODUCTION OF POLARIZATION MODE DISPERSION

(75) Inventors: William L. Kath, Evanston, IL (US); Gino Biondini, Columbus, OH (US); Sarah L. Fogal, Nashua, NH (US)

(73) Assignee: Northwestern University, Evanston, IL (US)

( * ) Notice: Subject to any disclaimer, the term of this patent is extended or adjusted under 35 U.S.C. 154(b) by 151 days.

(21) Appl. No.: 10/360,303

(22) Filed: Feb. 7, 2003

Related U.S. Application Data

(60) Provisional application No. 60/355,378, filed on Feb. 7, 2002.

(51) Int. Cl.
*G02B 6/00* (2006.01)
*G02B 6/17* (2006.01)
*H04J 14/06* (2006.01)

(52) U.S. Cl. .................. 385/123; 385/11; 385/122; 398/65; 398/81

(58) Field of Classification Search ............. 385/11, 385/122, 123; 398/65, 81
See application file for complete search history.

(56) References Cited

U.S. PATENT DOCUMENTS

| | | | |
|---|---|---|---|
| 5,623,207 A | 4/1997 | Weissenberger et al. | |
| 5,930,414 A | 7/1999 | Fishman et al. | |
| 5,969,525 A | 10/1999 | Van Driel et al. | |
| 6,377,719 B1 | 4/2002 | Damask | |
| 6,380,739 B1 | 4/2002 | Machida | |
| 6,381,385 B1 | 4/2002 | Watley et al. | |
| 6,385,357 B1 * | 5/2002 | Jopson et al. | 385/11 |
| 2001/0024538 A1 | 9/2001 | Khosravani et al. | |
| 2001/0046348 A1 | 11/2001 | Sarkimukka et al. | |
| 2001/0055437 A1 | 12/2001 | Khosravani et al. | |
| 2002/0012487 A1 | 1/2002 | Damask | |
| 2002/0015547 A1 | 2/2002 | Patel | |
| 2002/0018267 A1 | 2/2002 | Sun et al. | |
| 2002/0075477 A1 | 6/2002 | Yu et al. | |
| 2002/0080467 A1 | 6/2002 | Damask | |
| 2002/0118455 A1 | 8/2002 | Damask | |
| 2002/0172486 A1 | 11/2002 | Fermann | |
| 2002/0186916 A1 | 12/2002 | Bessios | |
| 2002/0191257 A1 | 12/2002 | Bessios | |
| 2002/0191285 A1 | 12/2002 | Damask et al. | |

OTHER PUBLICATIONS

Foschini, G.J., and Poole, C.D. "Statistical theory of polarization dispersion in single mode fibers," J. Lightwave Technology 9, 1439-1456 (1991).

(Continued)

*Primary Examiner*—Frank G. Font
*Assistant Examiner*—Mary El-Shammaa
(74) *Attorney, Agent, or Firm*—Reinhart Boerner Van Deuren s.c.

(57) ABSTRACT

A method and a system to produce, either in numerical simulations or in experiments, specified amounts of first, second and higher order PMD in a controlled manner, in particular large amounts. Parameters can be adjusted to obtain specific ranges of first, second and higher order PMD, and importance sampling can be used to determine the probability that the resulting PMD events can be obtained in realistic situations. Individual results obtained using specific parameter values can be combined to produce even larger ranges of PMD.

20 Claims, 18 Drawing Sheets

OTHER PUBLICATIONS

Gordon, J.P. and Kogelnik, H. "PMD fundamentals: polarization-mode dispersion in optical fibers," Proc. Nat. Acad. Sci. 97, 4541 (2000).

Damask, J.N. "A programmable polarization-mode dispersion emulator for systematic testing of 10 Gb/s PMD compensators," in Optical Fiber Communication Technical Digest, (Optical Society of America (Mar. 2000).

Veach, E. "Robust Monte Carlo methods for light transport simulation," Ph.D. thesis, Stanford University (Dec. 1997).

Biondini, G. and Kath, W.L. "Simulating rate events in optical transmission systems," 2nd IMACS Int'l Conference (Apr. 2001).

* cited by examiner

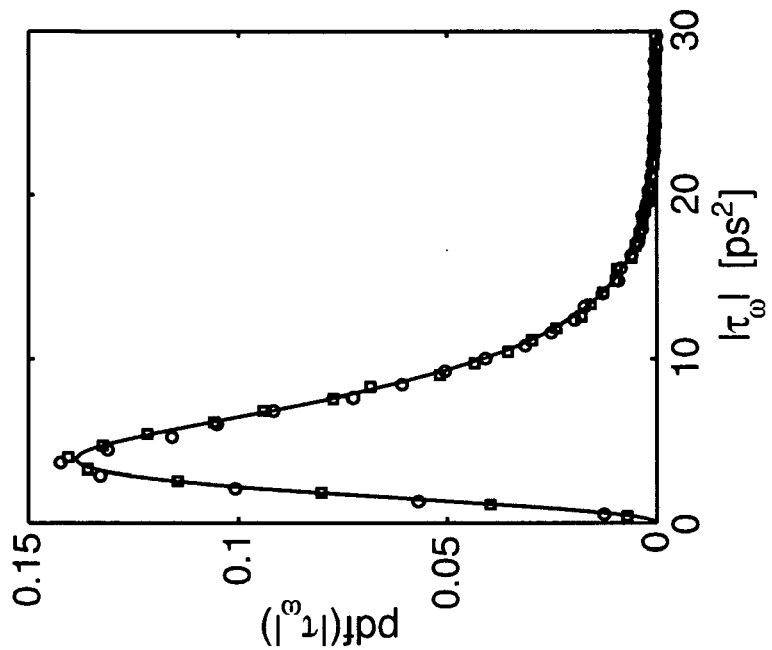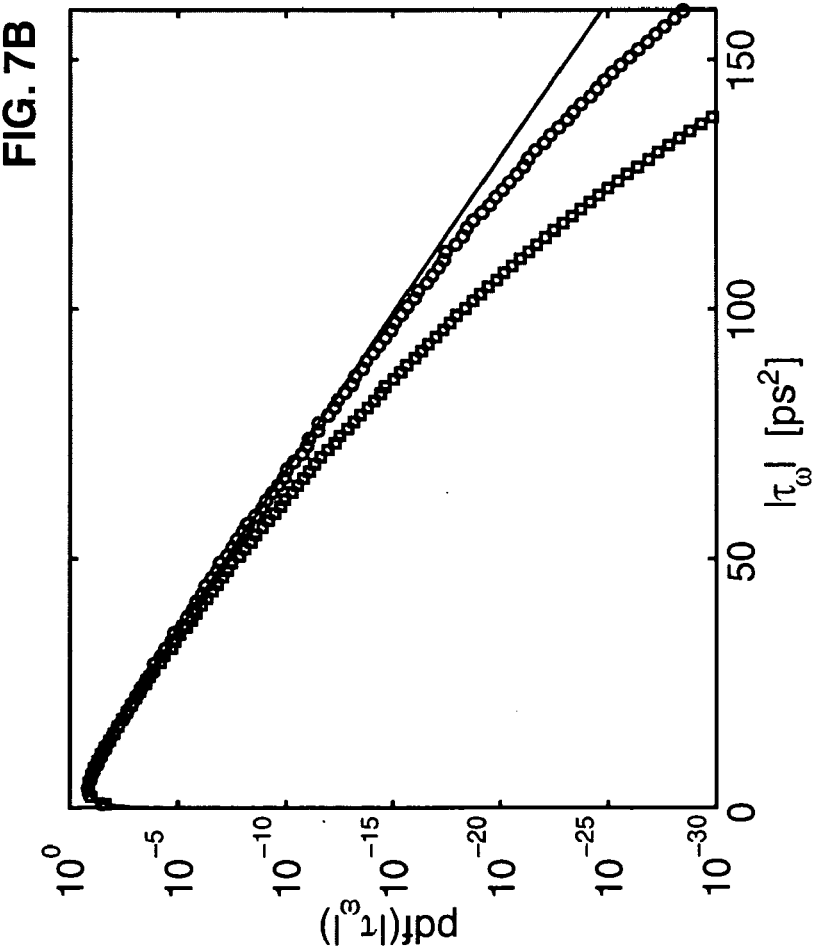

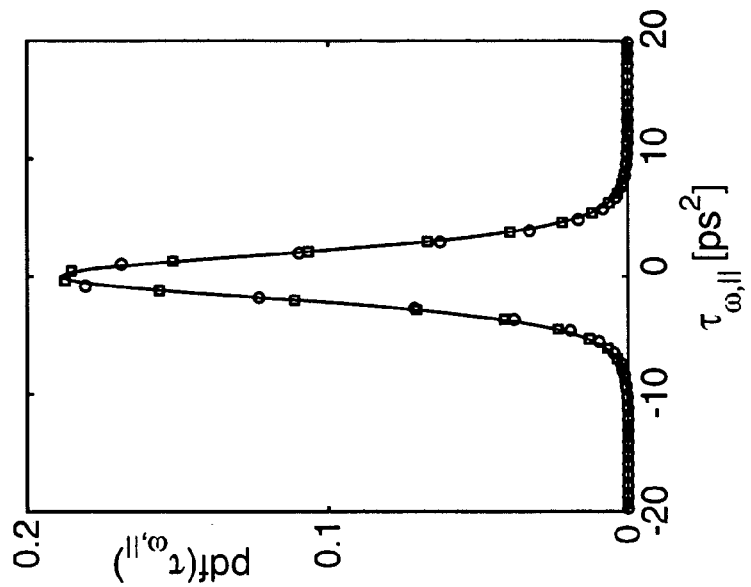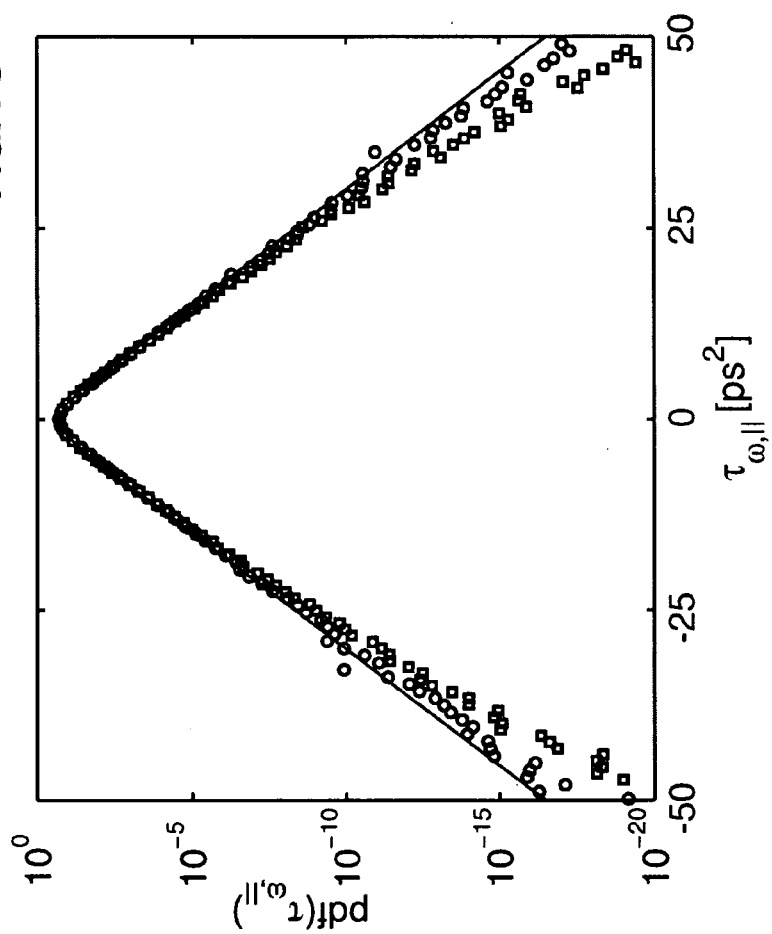

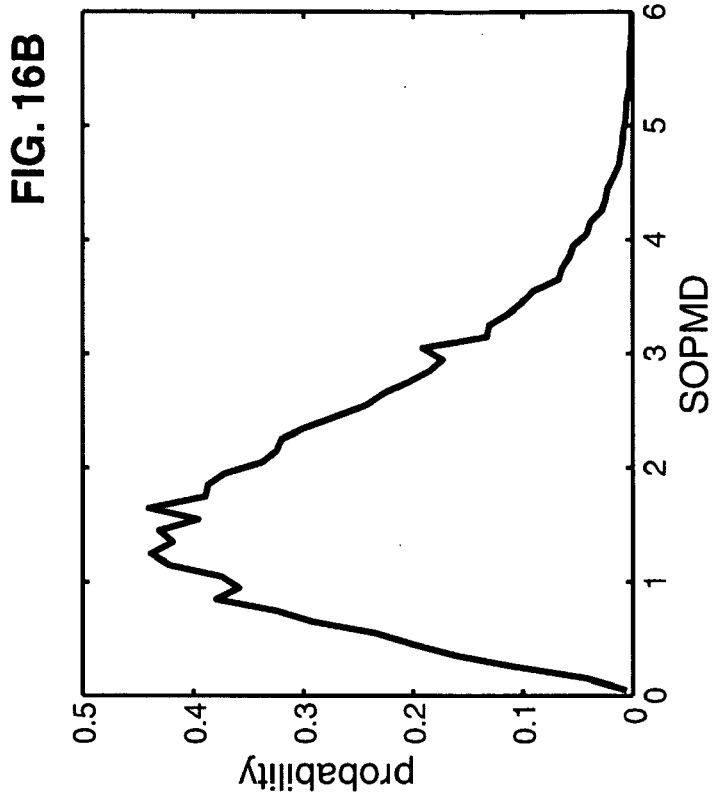
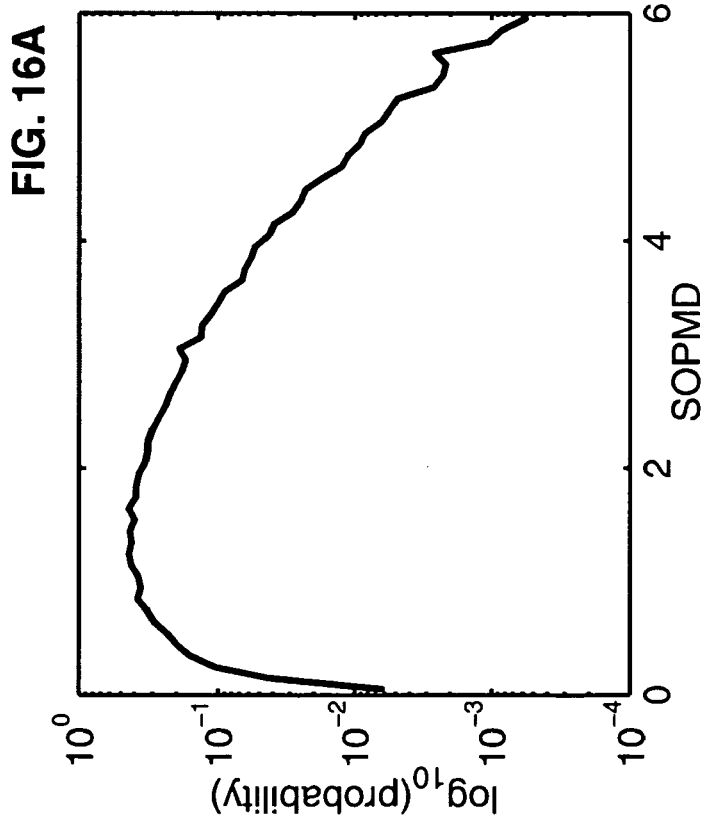
FIG. 16A
FIG. 16B

METHOD AND SYSTEM FOR THE CONTROLLED PRODUCTION OF POLARIZATION MODE DISPERSION

CROSS REFERENCE TO RELATED APPLICATION

This application claims priority of provisional application No. 60/355,378, filed on Feb. 7, 2002.

STATEMENT REGARDING FEDERALLY SPONSORED RESEARCH

The United States Government has certain rights to this invention pursuant to Grant Nos. DMS-9804602, DMS-0101476, and DGE-9987577 from the National Science Foundation, and Grant No. F49620-99-1-0016 from the Air Force Office of Scientific Research, all to Northwestern University.

BACKGROUND OF THE INVENTION

Field of the Invention

The present invention relates generally to optical fiber signal transmission, and more particularly, to the generation of polarization-mode dispersion (PMD) to emulate the natural occurrence of PMD in optical fiber and to use PMD generation to compensate for PMD generated by optical fiber.

Optical fibers do not have perfect properties. Slight irregularities and asymmetries introduced during the manufacturing process, or during installation, lead to optical fibers with birefringence, a property whereby one particular optical polarization propagates slightly faster than the other. Furthermore, these perturbations vary randomly with distance and over time. The varying fiber properties produce random polarization state changes in a propagating optical signal, which when combined with the birefringence lead to signal distortion known as polarization mode dispersion (PMD).

Light propagating in an optical fiber possesses two optical polarizations, directions perpendicular to the axis of the fiber and to each other along which the oscillations of the electromagnetic field are aligned. In the case of birefringent materials, these two polarizations organize themselves into two principal polarization states that travel at different speeds. When an optical pulse is launched with an arbitrary input polarization, it is projected into the two principal states which then split or separate during propagation, resulting in temporal spreading known as differential group delay (DGD).

In optical fibers, birefringence arises either from manufacturing irregularities or from stresses introduced during cabling or installation, and varies randomly with distance and with time. In this case, the process of an optical pulse being decomposed into principal polarization states and splitting occurs randomly and continuously, leading to an increasing spreading of the pulse known as polarization mode dispersion (PMD). The average root-mean-square rate of spreading is known as the PMD coefficient, and is measured in units of $ps/\sqrt{km}$ for typical communications fibers [1,2].

An important measure of PMD is provided by the polarization dispersion vector, also called the PMD vector [2]. The magnitude of this vector is the differential group delay (DGD; also called first-order PMD), and its direction gives the principal polarization states. Because birefringence in a real fiber is random, in general the DGD is a random variable with a Maxwellian probability density function (pdf). Another important measure is the frequency derivative of the polarization dispersion vector, and is known as second-order PMD; this vector measures both polarization dependent chromatic dispersion and signal depolarization. While the first-order PMD or DGD describes the amount of the simplest form of pulse splitting caused by birefringence, second-order (and higher-order) PMD measures the amount of more complicated PMD-induced pulse distortions. In general, both the polarization dispersion vector and its frequency derivative are an important predictor of power penalties and outage probabilities caused by PMD.

With the increasing demand for larger optical transmission data rates, PMD has emerged as one of the major impairments to upgrading current per channel data rates to 10 Gbit/s and beyond in terrestrial wavelength-division-multiplexed (WDM) systems. For example, it has been reported that PMD is expected to be a significant problem at 40 Gbit/s, even in newly installed fiber. A key difficulty with PMD is that it is intrinsically a random phenomenon, and, as a consequence, the penalties it produces change not only randomly over distance because the fiber properties vary with distance, but also over time because the ambient temperature and other environmental parameters vary. In system design, a maximum power penalty is usually assigned to PMD, and one demands that the outage probability—that is, the probability of the PMD-induced penalty exceeding this allowed value—is very small, typically $10^{-6}$ or less. Because the desired outage probability is very small, it has been virtually impossible to use either Monte-Carlo simulations or laboratory experiments to determine it, due to the extremely large number of system configurations that must necessarily be explored in order to obtain a reliable estimate.

In the absence of effective tools for calculating outage probabilities, system designers have resorted to stopgap techniques. First of all, because desired outage probabilities are small, it is the tails of the probability distribution where large DGD values occur that are particularly important, since these rare events are the ones most likely to result in system outages. Because the direct calculation of probabilities in the tails of the pdf has not been feasible, an indirect technique that has been used is to produce artificially large DGD values, determine the penalties at these large DGDs, and then weight the results using the Maxwellian distribution. A fundamental problem with this method, however, is that there is no direct relationship between the DGD and the power penalty. In addition, different configurations of an optical fiber (or any other device with PMD) can give the same DGD but not contribute equally to the power penalty, and the relative weighting or importance of these configurations must be treated properly.

This problem is particularly acute when studying devices designed to be placed at the end of an optical fiber line to compensate the PMD accumulated during transmission. A stopgap approach for analyzing such systems consists of calculating the average DGD after PMD compensation; and then, assuming that the compensated DGD still obeys a Maxwellian distribution, to calculate the distribution of the power penalties and thus determine an estimate for the reduction in the outage probability. This approach is also seriously flawed, however, since recent work has made it clear that the DGD distribution in compensated systems is typically far from Maxwellian.

What is needed, of course, is a direct method that can determine the true probability of large PMD events. Such a method would allow PMD-induced penalties and the resulting outage probabilities to be correctly assessed.

A standard way of determining the effects of PMD is by using Monte-Carlo simulations, where random number generators are used to drive computational models of the physical variations described above. Similar techniques can be used experimentally; in this case, devices known as PMD emulators are used to generate the random PMD variations [3]. Because system designers require optical transmission systems to be extremely reliable, however, significant events (i.e., ones sufficiently serious to produce transmission errors) must by necessity be very rare. This requirement means that in a straightforward application of Monte-Carlo methods or experimental techniques, a prohibitively large number of results is needed to obtain accurate system statistics.

REFERENCES

The foregoing background information, together with other aspects of the prior art, including those teachings useful in light of the present invention, are disclosed more fully and better understood in light of the following references.
1. G. J. Foschini and C. D. Poole, "Statistical theory of polarization dispersion in single mode fibers," J. Lightwave Technology 9, 1439–1456 (1991).
2. J. P. Gordon and H. Kogelnik, "PMD fundamentals: polarization-mode dispersion in optical fibers," Proc. Nat. Acad. Sci. 97, 4541 (2000).
3. J. N. Damask, "A programmable polarization-mode dispersion emulator for systematic testing of 10 Gb/s PMD compensators," In *Optical Fiber Communication Technical Digest*, (Optical Society of America, 2000).
4. S. L. Fogal, G. Biondini, and W. L. Kath, "Multiple importance sampling for first- and second-order polarization-mode dispersion," Photon. Tech. Lett. 14, 1273–1275 (2002).
5. S. L. Fogal, G. Biondini, and W. L. Kath, "Correction to: Multiple importance sampling for first- and second-order polarization-mode dispersion," Photon. Tech. Lett. 14, 1487 (2002).
6. E. Veach, PhD thesis, "Robust Monte Carlo Methods for Light Transport Simulation", Stanford University, 1997.

SUMMARY OF THE INVENTION

The present invention provides a method and a system to produce, either in numerical simulations or in experiments, specified amounts of first, second and higher order PMD in a controlled manner, in particular large amounts. Parameters can be adjusted to obtain specific ranges of first, second and higher order PMD, and importance sampling can be used to determine the probability that the resulting PMD events can be obtained in realistic situations. Furthermore, individual results obtained using specific parameter values can be combined to produce even larger ranges of PMD values.

In accordance with the present invention, there is provided a method for producing specified amounts of first and second order and higher polarization mode dispersion (PMD) in a controlled manner, including, in particular, large amounts of PMD using a concatenation of birefringent elements or sections. The method includes (a) aligning the birefringent elements or sections with respect to one another; (b) determining at least a PMD vector for each birefringent element or section; (c) determining at least a total PMD vector for a number of said birefringent elements or sections that are connected together; (d) orienting a next birefringent element or section so that its PMD vector is properly aligned with respect to said total PMD vector; (e) updating at least the total PMD vector; and (f) repeating steps (b) through (e) for a plurality of birefringent elements or sections of the concatenation of birefringent elements or sections.

Further in accordance with the invention, there is provided a method for producing specified amounts of first and second order and higher polarization mode dispersion (PMD) in a controlled manner, including, in particular, large amounts of PMD, using a concatenation of birefringent elements or sections. The method includes the steps of (a) aligning the birefringent elements or sections with respect to one another; (b) determining at least a PMD vector for each birefringent element or section; (c) determining at least a total PMD vector for a number of said birefringent elements or sections that are connected together; (d) orienting a next birefringent element or section so that its PMD vector is properly aligned with respect to said total PMD vector; (e) biasing probability distributions used to randomly select the orientation of said next section for Monte-Carlo simulations so that large amounts of at least first- and second-order PMD values are obtained; (f) using likelihood ratios and weights of importance sampling to correct the probabilities for the biasing of probability distributions using a plurality of sets of biasing parameters; (g) updating at least the total PMD vector; (h) repeating steps (b) through (g) for a plurality of birefringent elements or sections of the concatenation of birefringent elements or sections; and (i) producing desired PMD or PMD-induced statistics using a plurality of biasing parameters.

The invention further provides a method for producing specified amounts of first and second order polarization mode dispersion (PMD) using a concatenation of birefringent sections. The method includes orienting the sections at different angles; determining at least first order polarization dispersion vectors after each section; producing continuum approximations of the PMD concatenation equations; targeting differential group delay (DGD); determining average values of PMD produced by a given set of biasing parameters; and using importance sampling to concentrate larger amounts of PMD at rare PMD that are most likely to produce transmission errors.

The invention further provides a method for producing at least first order polarization mode dispersion (PMD) using a concatenation of birefringent sections. The method includes (a) selecting a set of final biasing parameters; (b) selecting a final biasing angle and strength; (c) finding a unit vector $\hat{u}_1^{(n)}$ in the same direction as $\vec{\tau}^{(n)}$ (the total PMD vector up to the n-th section); (d) finding a unit vector $\hat{u}_2^{(n)}$ in the direction of the component of $\vec{\tau}_\omega^{(n)}$ (the frequency derivative of the PMD vector, or second-order PMD vector) that is perpendicular to $\vec{\tau}^{(n)}$; (e) finding the unit vector $\hat{u}_3^{(n)} = \hat{u}_1^{(n)} \times \hat{u}_2^{(n)}$; (f) determining a biasing vector $\vec{b}^{(n)}$; (g) choosing the alignment of the next section; (h) updating the PMD vector and its frequency derivative using PMD concatenation equations; (i) updating the probabilities using the importance sampling likelihood ratios and the weights associated with multiple importance sampling; (j) repeating steps (a) through (i) for all of sections; and (k) repeating steps (a) through (j) for all final biasing angles and strengths are done.

Further in accordance with the invention, there is provided a method for producing at least first-order polarization mode dispersion (PMD) using a concatenation of birefringent sections. The method includes (a) choosing a final target DGD value, $DGD_T$; (b) finding the unit vector $\hat{u}_1^{(n)}$ in the same direction as $\vec{\tau}^{(n)}$; (c) choosing a biasing vector $\vec{b}^{(n)} = (DGD_T - |\vec{\tau}^{(n)}|)/(N-n+1)$, where N is the total number of sections; (d) choosing the alignment of the next section; (e) updating the PMD vector and its frequency derivative are updated using the PMD concatenation equations as described herein; (f) updating the probabilities using the importance sampling likelihood; and (g) repeating steps (a) through (f) for all of the sections.

In accordance with another aspect of the invention, there is provided a polarization mode dispersion emulator for generating a polarization mode dispersion (PMD) spectrum. The polarization mode dispersion emulator includes a concatenation of birefringent elements in optical series; a plurality of polarization mode mixing elements each interposed between a different pair of adjacent ones of said birefringent elements; and means controlling said polarization mode mixing elements to produce specified amounts of first and second order and higher polarization mode dispersion (PMD) in a controlled manner, including, in particular, large amounts of PMD.

In one application, the method is used to evaluate transmission penalties due to PMD. This application results by targeting the simulations or experiments on the rare PMD events that are most likely to produce transmission errors. Use of the method produces speedups of several orders of magnitude over standard techniques, thereby obtaining results that would otherwise be beyond the capability of standard methods.

In another application, the algorithm is implemented in computer-controlled hardware, thus providing an emulator capable of producing desired amounts of first- and second-order PMD on demand. Such a device significantly speeds up hardware testing of optical transmission systems.

The method of targeting specific amounts of first- and second-order PMD, combined with importance sampling, allows low probability events to be simulated much more efficiently than previously possible. The technique allows one to explore rare PMD events with probabilities of or even smaller with only a few thousand simulations.

DESCRIPTION OF THE DRAWINGS

These and other advantages of the present invention are best understood with reference to the drawings, in which:

FIGS. 7A–7C show, for scramblers (squares) and waveplates (circles), the pdfs of the first-order PMD (FIG. 7A), the second-order PMD (FIG. 7B) and the PCD (FIG. 7C), obtained with pure first-order biasing, pure second-order biasing, and biasing for the PCD, respectively;

FIG. 16 is a simulation result for the conditional pdf of second-order PMD (SOPMD) at a target DGD equal to four.

DETAILED DESCRIPTION OF THE PREFERRED EMBODIMENT

The action of any linear, lossless element on an optical field is described, up to polarization-independent phase, by a unitary 2×2 transmission matrix $U(z,\omega)$ [2]. This matrix can be expressed as:

$$U(z,\omega) = \exp[-i(\phi/2)\hat{r} \cdot \vec{\sigma}] = 1\cos(\phi/2) - i\hat{r}\cdot\vec{\sigma}\sin(\phi/2), \quad (1)$$

$\vec{\sigma} = (\sigma_1, \sigma_2, \sigma_3)$ is a vector of Pauli matrices, and where $\hat{r}$ is a unit vector representing a rotation axis. Polarization effects can be characterized by the PMD vector $\vec{\tau}(z,\omega)$ (also called the polarization dispersion vector), which is the real three-dimensional vector defined by the relation $\vec{\tau} \cdot \vec{\sigma} = 2i(dU/d\omega)U^{-1}$. For linearly-birefringent elements, $\hat{r}$ is independent of frequency, and $\phi$ is linearly frequency-dependent: $\phi(\omega) = 2b'l\omega = \phi(\omega_0) + 2b'l(\omega - \omega_0)$, where b' is the birefringence strength of the element, l is its length and $\omega_0$ is a reference frequency. Use of such a form for the rotation angle allows frequency dependence to be included in the algorithm. In this case, the PMD vector is simply given by $\Delta\vec{\tau} = 2b'l\hat{r}$. In addition, if no circular birefringence is present, $\Delta\vec{\tau}$ lies on the equatorial plane of the Poincaré sphere.

Figure 1:
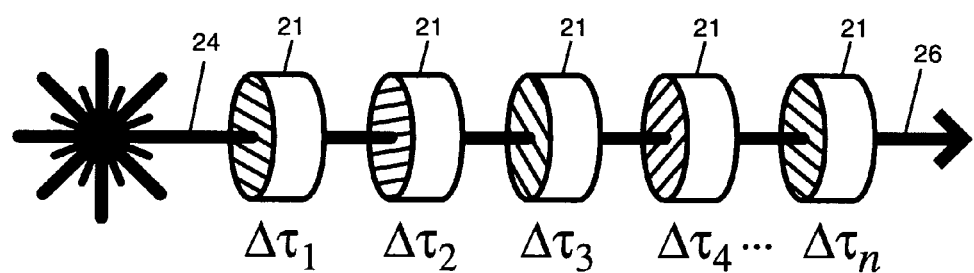
FIG. 1 is a schematic representation of a PMD emulator using a concatenation of birefringent sections oriented at different angles.
Figure 10:
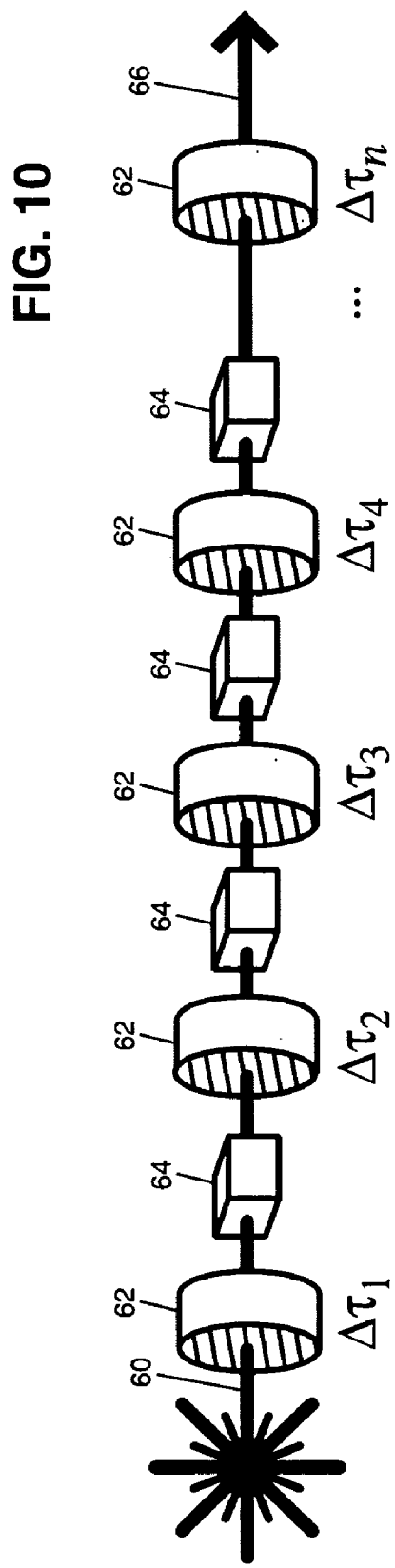
FIG. 10 is a schematic representation of a PMD emulator using a concatenation of aligned birefringent sections with a polarization controller interposed between each pair of adjacent sections.

A standard technique for generating PMD is the coarse-step method, which approximates the continuous birefringence variations present in real fibers with a concatenation of fixed length birefringent sections. Many experimental PMD generation techniques also employ a concatenation of birefringent elements, such as high-birefringence fibers or birefringent waveplates, the latter being indicated schematically in FIG. 1. FIG. 1 is a schematic representation of a PMD emulator 20 using a concatenation of N birefringent sections 21 oriented at different angles and connected by rotatable connectors. During operation, an input beam 24 propagates sequentially through each of the birefringent sections producing an output optical beam 26. These birefringent sections can also be interconnected by polarization scramblers (e.g., polarization controllers), as shown in FIG. 10.

Figure 2:
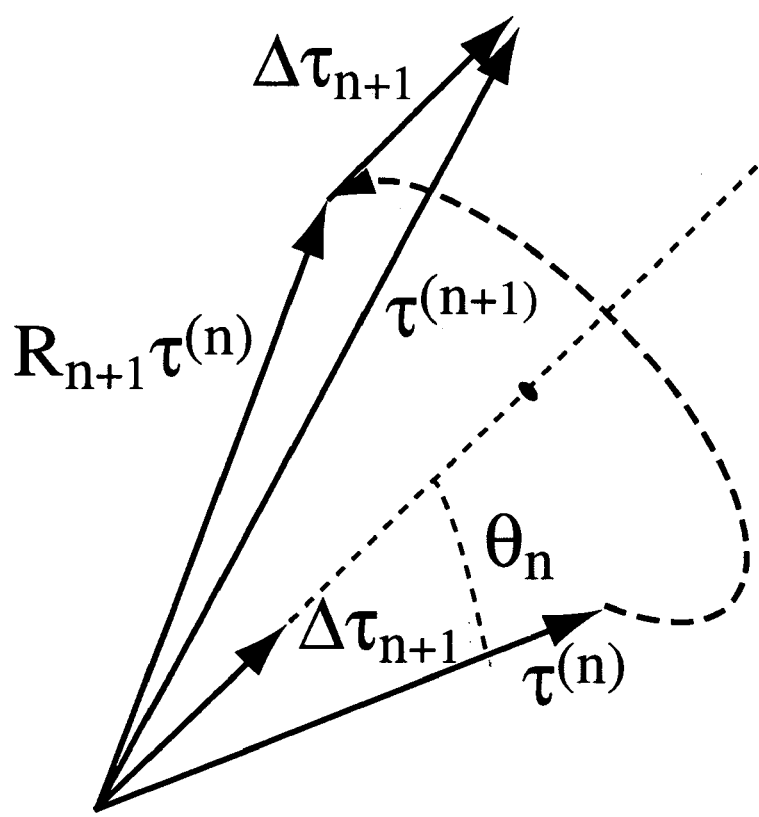
FIG. 2 is a graphical representation of the first-order PMD concatenation.

In any of these cases, the total polarization dispersion vector after the (n+1)-st section can be obtained from the PMD concatenation equation:

$$\vec{\tau}^{(n+1)} = R_{n+1}\vec{\tau}^{(n)} + \Delta\vec{\tau}_{n+1}, \quad (2)$$

as shown in FIG. 2 which is a graphical representation of the first-order PMD concatenation. Here $\vec{\tau}^{(n)}$ is the polarization dispersion vector after n sections and $\Delta\vec{\tau}_{n+1}$ is the polarization dispersion vector of the (n+1)-st section. The length of the vector $\Delta\vec{\tau}_{n+1}$ is the differential group delay for the (n+1)-st section, and the direction of this vector gives both the type of birefringence (i.e., linear, circular or elliptical) and the physical orientation of the birefringent element. For linearly birefringent elements, $\Delta\vec{\tau}_{n+1}$ lies in the equatorial plane of the Poincaré sphere. The Müller matrix $R_{n+1}$ is the Jones' matrix $U_{n+1}$ rewritten in Stokes' space [2]:

$$R_{n+1} = \exp[\varphi_{n+1}(\hat{r}_{n+1}x)] \quad (3)$$
$$= (\cos\varphi_{n+1})I + (1 - \cos\varphi_{n+1})\hat{r}_{n+1}\hat{r}_{n+1}^T + (\sin\varphi_{n+1})\hat{r}_{n+1}x. \quad (4)$$

$R_{n+1}$ represents a frequency dependent phase rotation in Stokes' space through an angle $\phi_{n+1}$ about the axis $\hat{r}_{n+1}$. This is not an ordinary rotation of physical three-dimensional space, but rather is a way to represent the phase difference that accumulates between the two polarizations due to the birefringence; this phase difference both increases with distance and varies with frequency. In addition, for linearly birefringent elements $R_{n+1}\Delta\vec{\tau}_{n+1} = \Delta\vec{\tau}_{n+1}$, and therefore Equation (2) can be written as:

$$\vec{\tau}^{(n+1)} = R_{n+1}(\vec{\tau}^{(n)} + \Delta\vec{\tau}_{n+1}). \quad (5)$$

When polarization controllers are present, an additional rotation matrix $Q_{n+1}$ precedes $\vec{\tau}^{(n)}$ in the PMD concatenation equations. It is then possible to factor out altogether this rotation $Q_{n+1}$ from the second PMD concatenation equation; the resulting equation is identical to equation (2) with a new rotation matrix $R'_{n+1} = R_{n+1}Q_{n+1}$, except that the new contributions $\Delta\vec{\tau}'_{n+1} = Q_{n+1}^{-1}\Delta\vec{\tau}_{n+1}$ are now uniformly distributed on the Poincaré sphere. Thus, apart from the rotation $R'_{n+1}$, the case of polarization scramblers is formally equivalent to a three-dimensional random walk. In the following, we refer to the situation where there are no polarization controllers as the case of rotatable waveplates.

A concatenation equation similar to Equation (2) holds for the second-order PMD vector, i.e., the frequency derivative of the PMD vector:

$$\vec{\tau}_\omega^{(n+1)} = R_{n+1}\vec{\tau}_\omega^{(n)} + \Delta\vec{\tau}_{(n+1)} \times \vec{\tau}^{(n+1)} + \Delta\vec{\tau}_{n+1,\omega}. \quad (6)$$

For linearly birefringent elements, $\Delta\vec{\tau}_{n+1,\omega} = 0$, and since $R_{n+1}\Delta\vec{\tau}_{n+1} = \Delta\vec{\tau}_{n+1}$, Equation (6) can be rewritten in a form similar to Equation (5):

$$\vec{\tau}_\omega^{(n+1)} = R_{n+1}(\vec{\tau}_\omega^{(n)} + \Delta\vec{\tau}_{n+1} \times \vec{\tau}^{(n)}). \quad (7)$$

As with the first-order concatenation equation, polarization scramblers add an additional rotation matrix $Q_{n+1}$ preceding $\vec{\tau}_\omega^{(n)}$ in Equations (6) and (7). Similar to before, Equation (7) can then be written in an identical form but with a new rotation matrix $R'_{n+1} = R_{n+1}Q_{n+1}$, and with the new contributions $\Delta\vec{\tau}'_{n+1} = Q_{n+1}^{-1}\Delta\vec{\tau}_{n+1}$ uniformly distributed on the Poincaré sphere.

Controlled Production of First- and Second-Order PMD

Method #1

Consider first the case of birefringent sections, where because of the rotation matrix $Q_{n+1}$ there are no constraints on the relative orientation between $\vec{\tau}^{(n)}$ and $\Delta\vec{\tau}_{n+1}$. The method first determines how to set the relative orientation of the sections to maximize the DGD, the second-order PMD, or any combination of the two.

A potential way to determine the maximums of the PMD that can be produced by a finite number of linearly birefringent sections is to solve Equations (5) and (7) and then optimize the result. However, the equations prove to be too complicated for this approach to be successful. But, it is possible to solve a continuum approximation of these equations that is obtained when $|\Delta\vec{\tau}| \ll |\vec{\tau}|$.

First, from Equations (5) and (7) it can be seen that:

$$\tau^{(n+1)} = \tau^{(n)} + \vec{\tau}^{(n)} \cdot \Delta\vec{\tau}_{n+1} + \ldots, \quad (8)$$

where $\tau^{(n)} = |\vec{\tau}^{(n)}|$ is the length of the PMD vector, i.e., the DGD, and the neglected terms are $O(|\Delta\vec{\tau}_{n+1}|^2)$. Note that when written in this form, the Müller matrix $R_{n+1}$ drops out of the equation. Furthermore, this result demonstrates that the DGD is increased by the part of $\Delta\vec{\tau}_{n+1}$ that is parallel to $\vec{\tau}^{(n)}$. This result, and the presence of the cross product $\Delta\vec{\tau}_{n+1} \times \vec{\tau}^{(n)}$ in Equation (7), suggests that it is natural to describe the PMD vector of the next section, $\Delta\vec{\tau}_{n+1}$, using a coordinate system defined relative to $\vec{\tau}^{(n)}$ and $\vec{\tau}_\omega^{(n)}$. All vectors are therefore written in terms of components relative to the orthonormal frame of reference $\mathcal{u}^{(n)}$ formed by the unit vectors $\{\hat{u}_1^{(n)}, \hat{u}_2^{(n)}, \hat{u}_3^{(n)}\}$, where:

$$\hat{u}_1^{(n)} = \frac{\vec{\tau}_{(n)}}{|\vec{\tau}^{(n)}|}, \quad (9a)$$

$$\hat{u}_2^{(n)} = \frac{\vec{\tau}_{\omega,\perp}^{(n)}}{|\vec{\tau}_{\omega,\perp}^{(n)}|}, \quad (9b)$$

$$\hat{u}_3^{(n)} = \hat{u}_1^{(n)} \times \hat{u}_2^{(n)}. \quad (9c)$$

Figure 3:
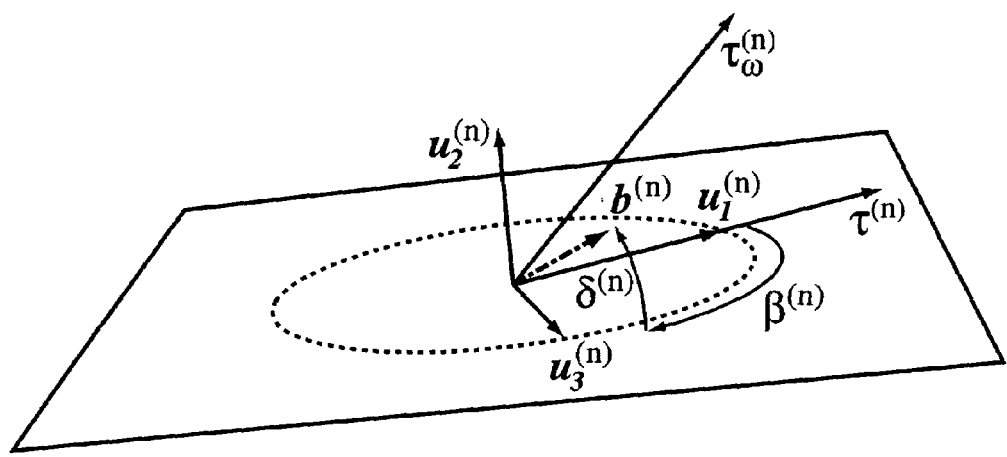
FIG. 3 is a diagram showing a local coordinate system $\mathcal{U}^{(n)}$ identified by $\vec{\tau}^{(n)}$, $\vec{\tau}_\omega^{(n)}$ and $\vec{\tau}^{(n)} \times \vec{\tau}_\omega^{(n)}$, and a preferential direction $\vec{b}^{(n)}$ for biasing simulations.

This local coordinate system is illustrated in FIG. 3; here $\vec{\tau}_{\omega,\perp}^{(n)}$ is the component of $\vec{\tau}_\omega^{(n)}$ perpendicular to $\vec{\tau}^{(n)}$, that is, $\vec{\tau}_{\omega,\perp}^{(n)} = \vec{\tau}_\omega^{(n)} - \vec{\tau}_{\omega,\|}^{(n)}$, where $\vec{\tau}_{\omega,\|}^{(n)} = (\vec{\tau}_\omega^{(n)} \cdot \hat{u}_1^{(n)})\hat{u}_1^{(n)}$. The magnitudes of $\vec{\tau}_{\omega,\|}$ (the component of $\vec{\tau}_\omega$ parallel to $\vec{\tau}$) and $\vec{\tau}_{\omega,\perp}$ quantify the polarization chromatic dispersion (PCD) and the depolarization, respectively. The local coordinate system is identified by $\vec{\tau}^{(n)}$, $\vec{\tau}_\omega^{(n)}$ and $\vec{\tau}^{(n)} \times \vec{\tau}_\omega^{(n)}$. Note, then that $$\vec{\tau}^{(n)} = \tau^{(n)}\hat{u}_1^{(n)}, \tag{10a}$$

$$\vec{\tau}_\omega^{(n)} = \tau_{\omega,\|}^{(n)}\hat{u}_1^{(n)} + \tau_{\omega,\perp}^{(n)}\hat{u}_2^{(n)}, \tag{10b}$$

where $\tau_{\omega,\|}^{(n)} = |\vec{\tau}_{\omega,\|}|$ and $\tau_{\omega,\perp}^{(n)} = |\vec{\tau}_{\omega,\perp}|$.

To obtain a continuum approximation of Equation (8), first we define the quantity $z=n\Delta z$, where $\Delta z$ is the length of the birefringent section, and then define $\Delta \vec{\tau}_{n+1} = \vec{b}(z)\Delta z$. In the limit $\Delta z \to 0$, we then have $\Delta \tau^{(n+1)}/\Delta z \to d\tau/dz$. Using Equation (8), and similar equations for $\tau_{\omega,\|}$ and $\tau_{\omega,\perp}$, along with Equations (9) and (10), we then obtain equations [4,5]:

$$\frac{d\tau}{dz} = b_1, \tag{11a}$$

$$\frac{d\tau_{\omega,\|}}{dz} = b_2 \frac{\tau_{\omega,\perp}}{\tau}, \tag{11b}$$

$$\frac{d\tau_{\omega,\perp}}{dz} = b_3\tau - b_2 \frac{\tau_{\omega,\|}}{\tau}, \tag{11c}$$

where $(b_1, b_2, b_3)$ are now the components of $\vec{b}(z)$ with respect to $\mathcal{u}^{(n)}$. These are the continuum approximations of the PMD concatenation equations.

The above equations can be solved exactly and the result used to guide importance-sampled Monte-Carlo simulations of the PMD concatenation equations. First of all, it is noted that if we write $\vec{b}(z) = b(z)\hat{b}(z)$, with $|\hat{b}(z)|=1$, we can rescale the z variable using $$\frac{d}{dz} = b(z)\frac{d}{d\zeta} \Leftrightarrow \frac{d\zeta}{dz} = b(z)$$

or $$\zeta = \int_0^z b(z')dz',$$

so that $\vec{b}$ in Equations (11) becomes a unit vector. Scaling by another constant makes the length of $\vec{b}$ arbitrary and the same for each section. This means that the solution for the case of non-equal length sections can be found from the solution for equal length sections. There is therefore no loss of generality in assuming equal length sections in what follows. Importantly, the algorithm is easiest to explain for equal-length sections, but it is not limited to this case. The solution of Equations (11) is then [4,5]:

$$\tau(z) = \int_0^z b_1(z')dz', \tag{12a}$$

$$\tau_{\omega,\|}(z) = \int_0^z b_3(z')\tau(z')\sin[B(z,z')]dz', \tag{12b}$$

$$\tau_{\omega,\perp}(z) = \int_0^z b_3(z')\tau(z')\cos[B(z,z')]dz', \tag{12c}$$

where $$B(z, z') = \int_{z'}^z \frac{b_2(z'')}{\tau(z'')}dz''. \tag{13}$$

Calculus of variations can be used to find the choice of $\vec{b}(z)$ that maximizes the DGD, the second-order PMD, or any combination of the two, as defined by Equations (12). The result is [4,5]

$$b_1(z) = b\cos\beta(z),\; b_2(z) = 0,\; b_3(z) = b\sin\beta(z), \tag{14}$$

with b=const, and with a linearly varying angle profile:

$$\beta(z) = \beta_{max} z/z_{max} \tag{15}$$

with $\beta_{max}$ a parameter. The choice $\beta_{max}=0$ maximizes the DGD, while $\beta_{max}=\pi/2$ maximizes the second-order PMD. Other values in the range $0 < \beta_{max} < \pi$ maximize other combinations of first- and second-order PMD.

For example, when $\beta_{max}=0$, the above results show that the configurations that lead to large DGD values are the ones in which the individual contributions to the polarization dispersion vector from each section tend to be aligned with the total PMD vector from all previous sections. Note this does not necessarily mean that the birefringent elements physically align with each other (although this is true for linearly birefringent elements with no polarization scramblers). More generally, the results show that the total amount of first- and second-order PMD can be effectively controlled by monitoring the first- and second-order polarization dispersion vectors, $\vec{\tau}^{(n)}$ and $\vec{\tau}_\omega^{(n)}$, after each section, and choosing the polarization dispersion vectors of the next section, $\Delta\vec{\tau}_{n+1}$, appropriately relative to $\vec{\tau}^{(n)}$ and $\vec{\tau}_\omega^{(n)}$.

The above equations are approximate for a finite number of sections, although the approximation gets better as the number of sections increases. When used with Monte-Carlo simulations and importance sampling, however, the combination becomes a highly effective tool for generating PMD. Essentially, importance sampling biases the Monte-Carlo simulations so that the random trials are concentrated on the regions of sample space that are of greatest interest; in this case, these regions are the ones where first- and second-order PMD is large. A good approximation that tells how to obtain such large values is more than sufficient for importance sampling to work.

At this point, a discussion of importance sampling is helpful. Suppose one is interested in determining the probability P that a random variable which depends upon the angles $(\theta_1, \theta_2, \ldots \theta_N) = \theta$ specifying the orientation of the birefringent sections falls in a given range; here N is the total number of sections. Here, as an illustration, we will explain how the method is applied to determine the total DGD, $|\vec{\tau}^{(N)}|$, but the method can be applied to any random variable, such as the amount of pulse broadening or the power penalty. The probability P can be represented as the expectation value of an indicator function $I(\theta)$, where $I=1$ if the random variable of interest falls in the prescribed range and $I=0$ otherwise. Using importance sampling, one can write the Monte-Carlo estimate of the above probability as:

$$P = \frac{1}{M} \sum_{k=1}^{M} I(\theta_k) L(\theta_k), \tag{16}$$

where M is the total number of trials and $L(\theta)=p(\theta)/p^*(\theta)$ is the importance sampling likelihood ratio. Here $p(\theta)$ is the unbiased joint probability distribution function for the angles, while $p^*(\theta)$ is the biased distribution which is actually used to draw the samples $\theta_k$. If $p^*(\theta) \equiv p(\theta)$, Equation (16) simply yields the relative number of trials falling in the range of interest. The problem with this choice is that, when simulating low probability events, an exceedingly large number of samples is necessary in order for the desired events to occur. Using a biased probability distribution allows the desired regions of sample space to be visited much more frequently. At the same time, the likelihood ratio $L(\theta)$ automatically adjusts the results so that all of the different realizations are correctly weighted, thus contributing properly to the final probability.

When polarization scramblers are present, the length and orientation of the successive differential polarization dispersion vectors $\Delta \vec{\tau}_{n+1}$ can be regarded as fixed, while the polarization scramblers act to rotate the orientation of $\vec{\tau}^{(n)}$ and $\vec{\tau}_\omega^{(n)}$. As mentioned previously in the discussion following Equation (5), however, it is equivalent to think of $\vec{\tau}^{(n)}$ and $\vec{\tau}_\omega^{(n)}$ as being fixed and instead rotate $\Delta \vec{\tau}_{n+1}$. From this perspective, the simulations are biased by choosing the scrambler's rotation so that $\Delta \vec{\tau}_{n+1}$ is preferentially aligned with the biasing direction $\vec{b}^{(n)} \equiv \vec{b}(n\Delta z)$ determined from $\vec{\tau}^{(n)}$ and $\vec{\tau}_\omega^{(n)}$. More specifically, we bias the angle $\theta_n$ between the biasing direction $\vec{b}^{(n)}$ and the next polarization dispersion vector $\Delta \vec{\tau}_{n+1}$ toward zero. This choice does not uniquely determine the orientation of $\Delta \vec{\tau}_{n+1}$ relative to $\vec{b}^{(n)}$, of course, since $\Delta \vec{\tau}_{n+1}$ can still be rotated by an arbitrary amount about $\vec{b}^{(n)}$ while keeping $\theta_n$ constant. We choose this additional rotational angle to be uniformly distributed.

When PMD generation is not biased, the angles $\theta_n$ associated with each section are independent random variables, with $\cos \theta_n$ uniformly distributed in $[-1,1]$. When applying importance sampling, one choice is to take $\cos \theta_n = 2x^{1/\alpha} - 1$, where x is a uniform random variable in $[0,1]$ and $\alpha$ is a biasing parameter. The value $\alpha=1$ reproduces the unbiased case, while increasing values of $\alpha$ progressively bias the configuration in the preferred direction. Each value of $\alpha$ allows the sampling of a different set of configurations. Other choices are possible for the biased distribution of the $\theta_n$; the effectiveness of the method is not very sensitive to the particular distribution used. The above choice, however, yields the likelihood ratio:

$$L(\theta) = \prod_{n=1}^{N} p_1(\cos\theta_n)/p_\alpha(\cos\theta_n) \tag{17}$$

where $p_\alpha(y)=(\alpha/2)[(1+y)/2]^{\alpha-1}$. It should be emphasized that different configurations with the same PMD can have very different likelihood ratios, and thus their relative contribution to the final result can vary substantially. Importance sampling weights the relative contributions from these different states appropriately so that they contribute correctly to the final answer.

Simple first-order-only biasing is achieved by choosing $\Delta \vec{\tau}_{n+1}$ to be preferentially aligned with the previous polarization dispersion vector $\vec{\tau}^{(n)}$ (that is, setting $\beta^{(n)}=0$ and $\delta^{(n)}=0$ for all sections). In this case, using increasing values of biasing strength $\alpha$ progressively produces larger and larger values of DGD, or first-order PMD. Unfortunately, this choice of biasing does not result in large values of the second-order PMD, $\vec{\tau}_\omega$, because successive contributions to the second-order polarization dispersion vector are small, since in this case $\Delta \vec{\tau}_{n+1} \times \vec{\tau}^{(n)}$ is close to zero, as seen from Equation (7).

A method to produce both large $\vec{\tau}$ and large $\vec{\tau}_\omega$ follows from Equations (14) and (15), however. The key is to properly choose the biasing directions $\vec{b}^{(n)} = \cos \beta^{(n)} \cos \delta^{(n)} \hat{u}_1 + \sin \delta^{(n)} \hat{u}_2 + \sin \beta^{(n)} \cos \delta^{(n)} \hat{u}_3$ as shown in FIG. 3 by specifying the angles $\beta^{(n)}$ and $\delta^{(n)}$. The optimal solution is to choose biasing directions $\vec{b}^{(n)}$ that are a discrete approximation of the expressions given in Equations (14) and (15). In particular, set $\delta^{(n)}=0$ and let $\beta^{(n)}$ increase linearly from an initial value of zero to a final value $\beta_N$, i.e., $\beta^{(k)}=(k-1)/(N-1)\beta_N$. The final values $\beta_N$ are chosen between 0 and $\pi$; different final values target different directions in the $\tau, \tau_\omega$ plane. For example, a final value $\beta_N=0$ targets large first-order PMD alone, while a final value $\beta_N=\pi/2$ targets second-order PMD. Similarly, a final value of $\beta_N=\pi$ targets the direction of large second-order and small first-order PMD. Intermediate final values target large values of other combinations of first- and second-order PMD. These choices for the angles determine the optimal biasing direction $\vec{b}^{(n)}$ after each section. One also needs to decide how strongly the simulations should be biased; as mentioned previously, for each choice of biasing direction a biasing strength ($\alpha$ in the example choice) must be chosen when randomly selecting the polarization dispersion vector of the next section. As before, in the example $\alpha$ is used when selecting the angle $\theta_n$ between the biasing direction $\vec{b}^{(n)}$ and $\Delta \vec{\tau}_{n+1}$. Note the choice of $\alpha$ is by way of example only.

To generate complete coverage of the $\tau, \tau_\omega$ plane, it is necessary to choose more than one set of biasing parameters, the final direction $\beta_N$ and the strength $\alpha$. By using a set of such values, it is possible to completely fill in all values of $\vec{\tau}$ and $\vec{\tau}_\omega$. The simultaneous use of a number of different biasing directions and strengths is known as multiple importance sampling, and several ways exist to combine the individual results. A particularly efficient algorithm is the use of balance heuristics, which has been shown to be asymptotically close to optimal for large numbers of realizations. Of course, the outputs of each Monte-Carlo realization must always be adjusted for the bias through the use of the likelihood ratios.

The set of biasing directions and strengths to be used depends, to a certain extent, upon the desired outcome. For example, if one only wants large DGD, then it is only necessary to use $\delta^{(n)}=0$ and $\beta^{(n)}=0$ with different biasing strengths $\alpha$. If only large second-order PMD is required, one can use $\delta^{(n)}=0$ and $\beta_N=\pi/2$. The determination of which biasing parameters to use can be aided by an approximate connection between the parameters used and the final first- and second-order PMD obtained. Recall that when using the prescribed algorithm, a random direction is chosen for $\Delta\vec{\tau}_{n+1}$ that is oriented at an angle $\theta_n$ away from the biasing direction $\vec{b}^{(n)}$ and also uniformly distributed around this biasing direction. Averaging first over the uniformly distributed rotation around $\vec{b}^{(n)}$, and then over the distribution for $\theta_n$ it is observed that:

$$<\Delta\vec{\tau}_{n+1}> = \Delta\tau<\cos\theta_n>\vec{b}^{(n)},$$

where $\Delta\tau$ is the length of $\Delta\vec{\tau}_{n+1}$, which is fixed, and $<\cos\theta_n>$ is the average of $\cos\theta_n$ (which for the example distribution given above depends only upon the biasing strength, $\alpha$, and not upon the step n). Now using Equations (14) and (15) for the biasing direction, and substituting the result in the average of Equation (11), we find:

$$\frac{d\langle\tau\rangle}{dz} = \Delta\tau\langle\cos\theta\rangle\cos(\beta_{max}z/z_{max}), \quad (18a)$$

$$\frac{d\langle\tau_{\omega,\|}\rangle}{dz} = 0, \quad (18b)$$

$$\frac{d\langle\tau_{\omega,\perp}\rangle}{dz} = \Delta\tau\langle\cos\theta\rangle\sin(\beta_{max}z/z_{max})\langle\tau\rangle, \quad (18c)$$

where the subscript on $<\cos\theta>$ has been dropped since the average is assumed to not depend upon n, and where we have used $<b_3\tau>=<b_3><\tau>$ in Equation (18c) since $b_3$ is chosen independently of the value of $\tau$. Equations (18) have the solution (assuming zero initial conditions):

$$\langle\tau(z)\rangle = \Delta\tau\langle\cos\theta\rangle\frac{z_{max}}{\beta_{max}}\sin(\beta_{max}z/z_{max}), \quad (19a)$$

$$<\tau_{\omega,\|}(z)>=0, \quad (19b)$$

$$\langle\tau_{\omega,\perp}(z)\rangle = \Delta\tau^2\langle\cos\theta\rangle^2\frac{z_{max}}{2\beta_{max}}\left[z - \frac{z_{max}}{2\beta_{max}}\sin(2\beta_{max}z/z_{max})\right]. \quad (19c)$$

When $z=z_{max}$, this becomes:

$$\langle\tau(z_{max})\rangle = \Delta\tau\langle\cos\theta\rangle z_{max}\frac{\sin(\beta_{max})}{\beta_{max}}, \quad (20a)$$

$$<\tau_{\omega,\|}(z)>=0, \quad (20b)$$

$$\langle\tau_{\omega,\perp}(z_{max})\rangle = \Delta\tau^2\langle\cos\theta\rangle^2 z_{max}^2\frac{2\beta_{max}-\sin(2\beta_{max})}{4\beta_{max}^2}. \quad (20c)$$

These equations allow one to determine the average values of the PMD produced by a given set of biasing parameters, e.g., the biasing strength $\alpha$ (which determines $<\cos\theta>$) and the final biasing direction $\beta_{max}\equiv\beta_N$. Note these expressions only give the mean values of the first- and second-order PMD; because of the random variations induced by the importance-sampled Monte-Carlo simulations, a distribution of values about these means is produced. In addition, non-zero polarization-dependent chromatic dispersion (PCD, $\tau_{\omega,\|}$) will be produced. The above results show that the method really biases first-order PMD and the second-order depolarization. Since the second-order PMD is related to the PCD and depolarization through $|\vec{\tau}_\omega|^2=\tau_{\omega,\|}^2+\tau_{\omega,\perp}^2$, and since $|\tau_{\omega,\|}|<<|\tau_{\omega,\perp}|$ in general, large depolarization and large second-order PMD are, to first order, synonymous.

It is possible to use this biasing scheme to obtain large values of PCD, however. Note PCD is of interest because it can cause pulse distortion. It can be shown that the final $\beta$ value that targets large positive PCD is $\beta_N=\pi$. The simulations for large PCD can be further sped up by biasing the angles $\delta^{(n)}$ for the last few sections toward slightly positive values (for positive PCD) and slightly negative values (for negative PCD). We have found that using angles $\delta^{(n)}$ that start close to zero and then increase relatively rapidly toward a particular final maximum works reasonably well, e.g., $\delta^{(n)}=\pm\delta_N(n/N)^\gamma$, where $\gamma$ is some power larger than 1 (this expression with a positive sign gives the optimum choice for large positive PCD, with a negative sign the optimum choice for large negative PCD). When a simulation with a specific number of sections is needed, good values of $\delta_N$ and $\gamma$ can be selected by performing a simple optimization: with $\beta_N=\pi$, one merely scans through possible choices of $\delta_N$ and $\gamma$ to determine the values that deterministically produce the largest PCD. The result then gives the biasing directions that can be used in the importance-sampled Monte-Carlo simulations.

Although the method specifically targets only large first- and second-order PMD, significant amounts of third- and higher-order PMD are also simultaneously generated. It is possible, of course, that targeted values of higher-order PMD might be desired in other situations. It is anticipated that a fuller range of biasing directions, in particular with $\delta^{(n)}\neq 0$, can be used to produce such statistics.

The following description of the generation and emulation methods for first- and second-order PMD are for those devices using a concatenation of birefringent elements or sections for fixed-length sections with polarization scramblers, referred to as method #1A and fixed-length sections with rotatable connectors, referred to as method #1B.

Specifically, then, the steps of the methods #1A and #1B are as follows: first one determines the first- and second-order polarization dispersion vectors after each section.

Figure 4:
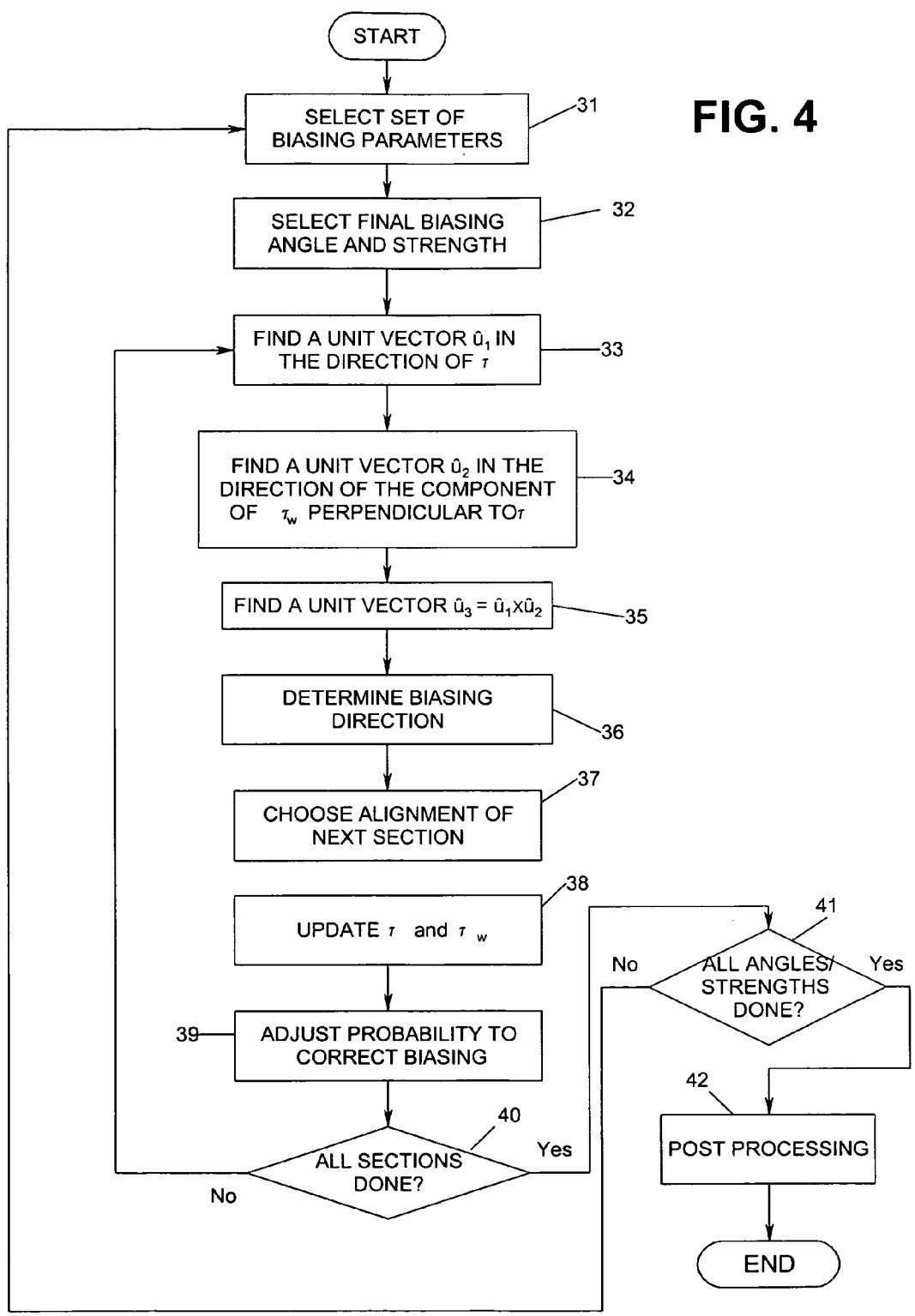
FIG. 4 is a flow diagram for a method of producing PMD in accordance with the present invention.

More specifically, with reference to FIGS. 3 and 4, the steps of the method #1 are as follows.

1. In step 31, choose a set of final biasing angles and strengths. For method 1A, map the final biasing angles and strengths to the final first- and second-order PMD values with Equations (20a–20c)
2. In step 32, select a final biasing angle and a strength.
3. In step 33, find a unit vector $\hat{u}_1^{(n)}$ in the same direction as $\vec{\tau}^{(n)}$. If this direction is indeterminate because $\vec{\tau}^{(n)}=0$, choose one randomly.
4. In step 34, find a unit vector $\hat{u}_2^{(n)}$ in the same direction as $\vec{\tau}_\omega^{(n)} - (\vec{\tau}_\omega^{(n)} \cdot \vec{\tau}^{(n)})\vec{\tau}^{(n)}$. This vector is $\vec{\tau}_{\omega,\perp}^{(n)}$, i.e., the component of $\vec{\tau}_\omega^{(n)}$ perpendicular to $\vec{\tau}^{(n)}$. One can first calculate $\vec{\tau}_{\omega,\|}^{(n)} = (\vec{\tau}_\omega^{(n)} \cdot \vec{\tau}^{(n)})\vec{\tau}^{(n)}$, and next $\vec{\tau}_{\omega,\perp}^{(n)} = \vec{\tau}_\omega^{(n)} - \vec{\tau}_{\omega,\|}^{(n)}$; then $\hat{u}_2^{(n)} = \vec{\tau}_{\omega,\perp}^{(n)}/|\vec{\tau}_{\omega,\perp}^{(n)}|$. If this direction is indeterminate because $\vec{\tau}_{\omega,\perp}^{(n)}=0$, choose randomly any direction that is perpendicular to $\hat{u}_1^{(n)}$.
5. In step 35, find the unit vector $\hat{u}_3^{(n)} = \hat{u}_1^{(n)} \times \hat{u}_2^{(n)}$. This unit vector will be in the same direction as the cross product $\vec{\tau}^{(n)} \times \vec{\tau}_\omega^{(n)}$.
6. In step 36, determine the biasing vector $\vec{b}^{(n)}$. For methods 1A and 1B, the components of $\vec{b}^{(n)}$ in the coordinate frame defined by $\{\hat{u}_1^{(n)}, \hat{u}_2^{(n)}, \hat{u}_3^{(n)}\}$ are (cos $\beta^{(n)}$cos $\delta^{(n)}$, sin $\delta^{(n)}$, sin $\beta^{(n)}$cos $\delta^{(n)}$). Here N is the total number of sections. For the special case of equal-length sections, optimal values are $\delta^{(n)}=0$ and $\beta^{(n)}=\beta_N(n-1)/(N-1)$ where $\beta_N$ is the final biasing angle selected in step 32. An equivalent expression for the case of fixed but non-equal length sections can be determined using the formulas given in the detailed description. Here $\beta^{(n)}$ is an angle in the plane of $\hat{u}_1^{(n)}$ and $\hat{u}_3^{(n)}$, measured positively from the $\hat{u}_1^{(n)}$ direction toward the $\hat{u}_3^{(n)}$ direction. Similarly, $\delta^{(n)}$ is an angle measured positively from the $\hat{u}_1^{(n)}$–$\hat{u}_3^{(n)}$ plane toward the $\hat{u}_2^{(n)}$ direction. Alternatively, the biasing direction $\vec{b}^{(n)}$ can be specified by using constants $a_1$, $a_2$ and $a_3$, and satisfying the condition $a_1^2+a_2^2+a_3^2=1$ and defining $\vec{b}^{(n)} = a_1\hat{u}_1^{(n)} + a_2\hat{u}_2^{(n)} + a_3\hat{u}_3^{(n)}$.
7. In step 37, choose the alignment of the next section. For method 1A, this is done by selecting a random angle $\theta_n$ between 0 and $\pi$ from a distribution biased toward 0, choosing the orientation of the next section so that the angle between the next section's PMD vector and the biasing direction is $\theta_n$ but so that it is otherwise uniformly distributed around the biasing direction. For method 1B, one also selects a random angle $\theta_n$ between $-\pi$ and $\pi$ so that it is biased toward zero. Then, one chooses the orientation of the next section so that the angle between its PMD vector (which must lie on the equatorial plane in Stokes' space) and the projection of the biasing direction onto the equatorial plane is $\theta_n$.
8. In step 38, update the PMD vector and its frequency derivative using the PMD concatenation equations described herein.
9. In step 39, update the probabilities using the importance sampling likelihood ratios as described herein and the weights associated with multiple importance sampling, as described in the PhD thesis "Robust Monte Carlo Methods for Light Transport Simulation" by E. Veach, Stanford University, 1997.
10. Step 40 determines if all sections are done. If not, the flow returns to step 33, otherwise the flow proceeds to step 41.
11. Step 41 determines whether all final biasing angles and strengths are done. If not, the flow returns to step 32, otherwise the flow proceeds to step 12. Steps 32–41 are repeated for a each member of a set of biasing angles $\beta^{(n)}$ and $\delta^{(n)}$, or equivalently, biasing direction constants $a_1$, $a_2$ and $a_3$.
12. Step 42 carries out any post-processing that may be necessary, such as constructing histograms of data generated by the method.

The orientation of all of the vectors is shown in the coordinate system illustrated in FIG. 3.

Figure 5:
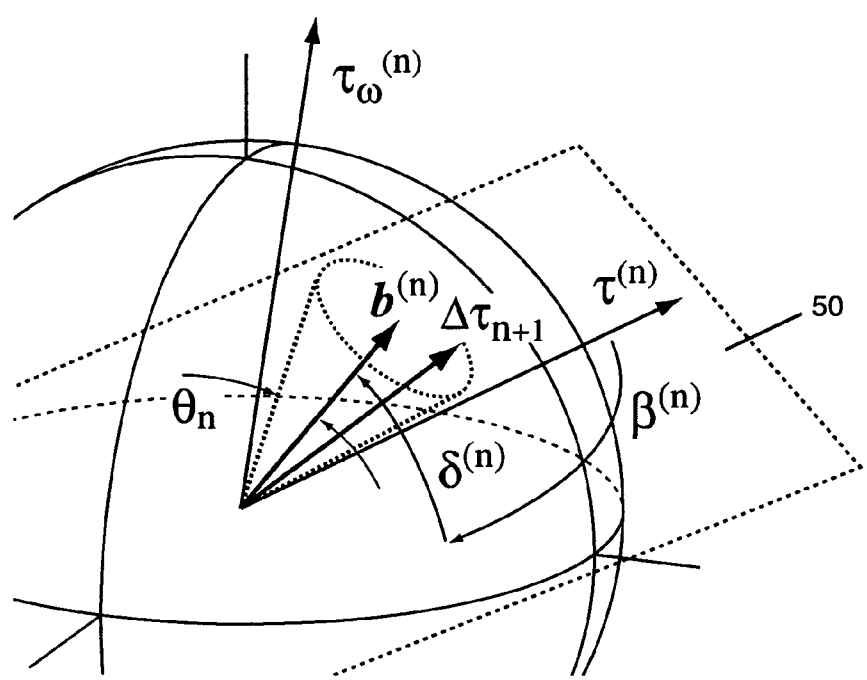
FIG. 5 illustrates a next section selection process for PMD generation using fixed length birefringent sections interconnected by polarization scramblers.

The following is a description of the next-section selection process for PMD generation using fixed-length birefringent sections connected by polarization scramblers in accordance with method #1A. Referring to FIG. 5, first, find the plane 50 formed by the unit vectors $\hat{u}_1^{(m)}$ and $\hat{u}_3^{(m)}$. The vectors $\vec{\tau}^{(n)}$ (this is proportional to $\hat{u}_1^{(m)}$) and $\vec{\tau}^{(n)} \times \vec{\tau}_\omega^{(n)}$ (proportional to $\hat{u}_3^{(m)}$) will lie in this plane. Using the computed angles $\beta^{(n)}$ and $\delta^{(n)}$, determine the biasing direction $\vec{b}^{(n)}$. Select a random angle $\theta_n$ between 0 and $\pi$ that is biased toward zero, and choose the action of the polarization scrambler so that PMD vector of the next section makes an angle $\theta_n$ with the biasing direction, but otherwise is uniformly distributed about it (i.e., uniformly distributed on a cone making an angle $\theta_n$ about the biasing direction). Note that in reality, it is the vectors $\vec{\tau}^{(n)}$, $\vec{\tau}_\omega^{(n)}$ and $\vec{b}^{(n)}$ that are rotated by the polarization scrambler, while the PMD vector of the next section in reality remains fixed. This completes the process of determining the orientation of the next birefringent section for this particular algorithm.

Figure 6:
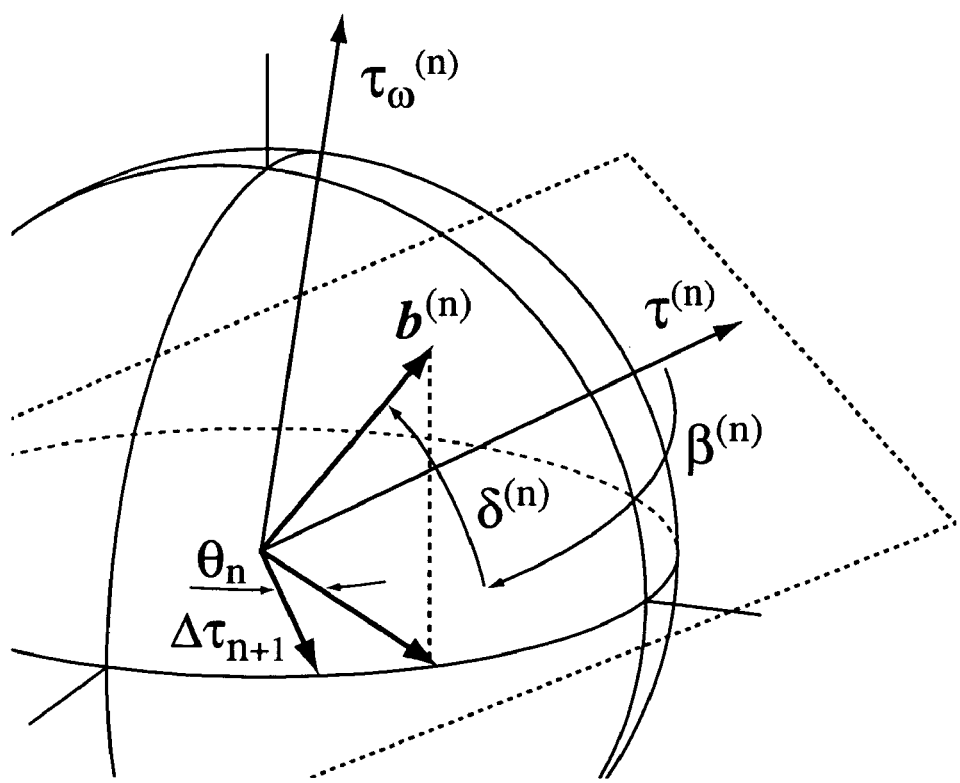
FIG. 6 illustrates a next section selection process for PMD generation using fixed length birefringent sections interconnected by rotatable connectors.

The following is a description of the next-section selection process for PMD generation using fixed-length birefringent sections connected by rotatable connectors, in accordance with method #1B. Referring to FIG. 6, first, find the plane 52 formed by the unit vectors $\hat{u}_1^{(m)}$ and $\hat{u}_3^{(m)}$. The vectors $\vec{\tau}^{(n)}$ (this is proportional to $\hat{u}_1^{(m)}$) and $\vec{\tau}^{(n)} \times \vec{\tau}_\omega^{(n)}$ (proportional to $\hat{u}_3^{(m)}$) will lie in this plane. Using the computed angles $\beta^{(n)}$ and $\delta^{(n)}$, determine the biasing vector $\vec{b}^{(n)}$. Select a random angle $\theta_n$ between $-\pi$ and $\pi$ that is biased toward zero, and choose the orientation of the next section so that its PMD vector $\Delta\vec{\tau}_{n+1}$ makes an angle $\theta_n$ with the projection of the biasing direction $\vec{b}^{(n)}$ onto the equatorial plane, as shown in FIG. 6. In this case, the angle $\theta_n$ is biased to be near zero, mod $2\pi$. (This is because for linearly birefringent sections, the PMD vector of each section must lie on the equatorial plane.) This completes the process of determining the orientation of the next birefringent section for this particular algorithm.

General Considerations for all Methods

When the frequency dependence is explicitly desired, the differential phase retardations $\phi_{n+1}(\omega)$ in the Müller matrix $R_{n+1}$ must also be specified. As mentioned previously, the proper choice for linearly birefringent elements is $\phi(\omega) = 2b'l\omega = \phi(\omega_0) + 2b'l(\omega - \omega_0)$, where b' is the birefringence strength of the element, l is its length and $\omega_0$ is a reference frequency. Recall in this case the PMD vector is $\Delta\vec{\tau} = 2b'l\hat{r}$.

In the case where the sections are connected via polarization scramblers, the value of $\phi(\omega_0)$ is unimportant, since a differential phase rotation of this type is generated by the scrambler. When including the frequency dependence, a simple strategy is to do the biasing at a single center frequency, but calculate the PMD vector over the entire required range of frequencies. Furthermore, when considering pulse propagation, it is convenient to calculate the Jones' form of the input-output transfer matrix, $U(z,\omega)$.

In the case of rotatable waveplates, the relative orientations between sections are the primary variables determining the generated PMD, and each differential PMD vector must lie in the equatorial plane of the Poincaré sphere. The biasing in this case is accomplished by choosing the next differential polarization dispersion vector, $\Delta\vec{\tau}_{n+1}$, to be preferentially aligned with the projection of the biasing direction $\vec{b}^{(n)}$ onto the equatorial plane. Specifically, we choose $\Delta\vec{\tau}_{n+1}$ so that the angle $\theta_n$ between it and the projection of $\vec{b}^{(n)}$ onto the equatorial plane is biased toward zero (mod $2\pi$). This is done, for example, by taking $\theta_n = \pi[1+\text{sgn}(2x-1)|2x-1|^{1/\alpha}]$, where x is again uniformly distributed between 0 and 1. Other choices for the probability distribution are possible, of course. Note that if $\alpha=1$ (unbiased case), $\theta_n$ is uniformly distributed between 0 and $2\pi$, while for $\alpha>1$, $\theta_n$ is concentrated near 0 and $2\pi$.

When simulating rotatable waveplates, the phase retardations in the Müller matrix $R_{n+1}$ must also be specified. Each beat length of a birefringent section generates a $2\pi$ retardation. In practice, sections with significant DGDs will be many beat lengths long, and unless the section lengths are precise to within a small fraction of a beat length, these retardations will vary from section to section. In this case, it makes sense to choose the retardation angles $\phi_{n+1}(\omega_0)$ to be uniformly distributed between 0 and $2\pi$. Alternatively, a random distribution of lengths $l_{n+1}$ can be assumed; if the variance of the lengths is large compared with the beat length, however, an approximately uniform distribution of the angles $\phi_{n+1}(\omega_0)$ results. If, of course, the lengths are very precise, then specific phase retardations should be used. Once these phase retardations are selected, different configurations are generated solely by rotating sections relative to one another. The results do not depend significantly upon the particular retardation angles used, except for certain clearly pathological cases such as identical angles with equal to 0 or $\pi$.

Sample Results

Figures 1, 7A:
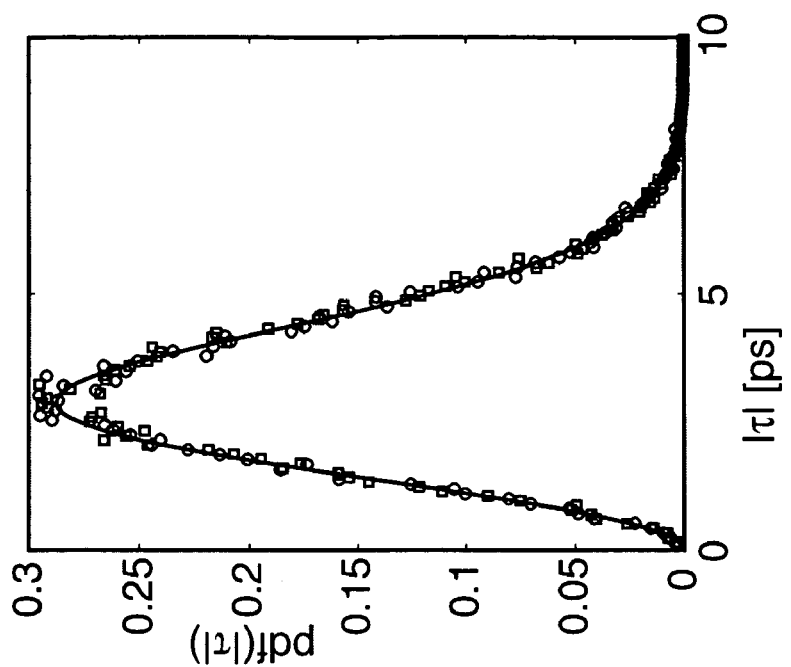
Figure 7A:
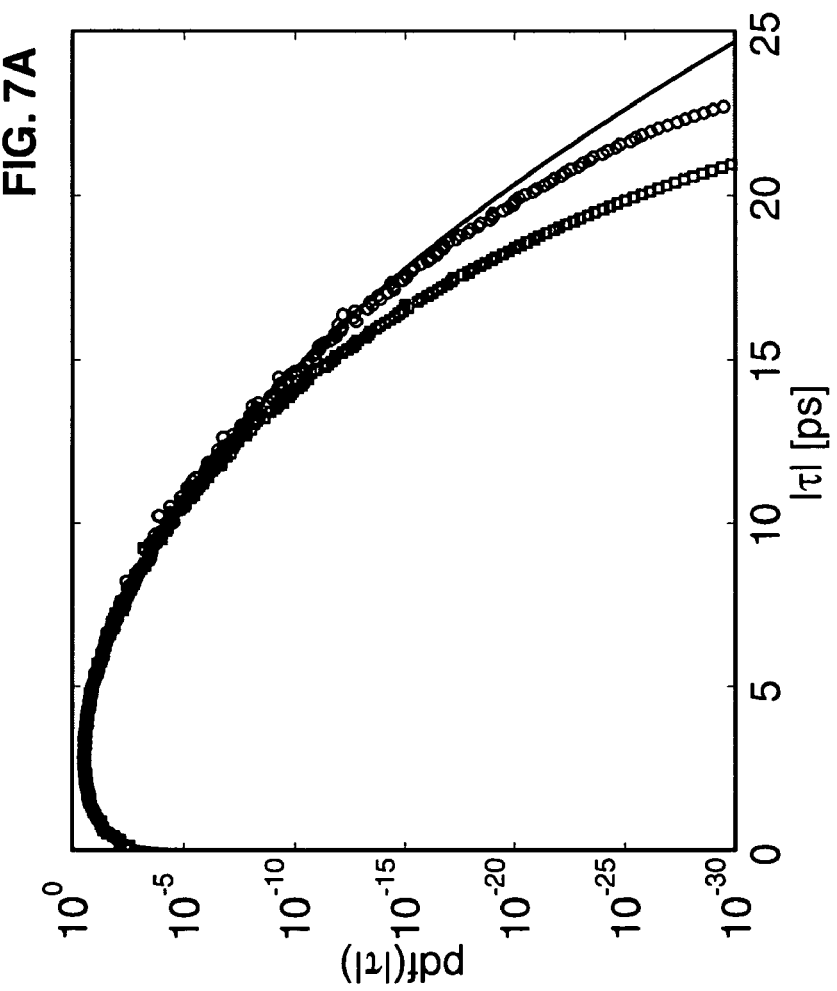

As an example of methods #1A and #1B, the case of a concatenation of 50 birefringent sections with 0.5 ps of DGD each is examined. FIGS. 7A–7C show, for scramblers (with data points shown as squares) and waveplates (with data points shown as circles), the pdfs of the first-order PMD (FIG. 7A), the second-order PMD (FIG. 7B) and the PCD (FIG. 7C), obtained with pure first-order biasing, pure second-order biasing, and biasing for the PCD, respectively (for PCD, only the case of scramblers is shown). The solid lines show the pdfs for real fiber and the insets are on a linear scale. A total of $4\times10^6$ Monte-Carlo realizations were used to obtain the curves in each of the FIGS. 7A–7C. For the PCD, we found that for 50 sections, the values $\delta_N=1.25$ and $\gamma=4.5$ were good choices. The solid line shows the analytical pdfs for real fiber. While waveplates seem to yield a slightly better agreement, the differences occur at extremely low probability levels for this number of birefringent sections. Note that increasing the number of sections further improves the agreement.

Figure 8:
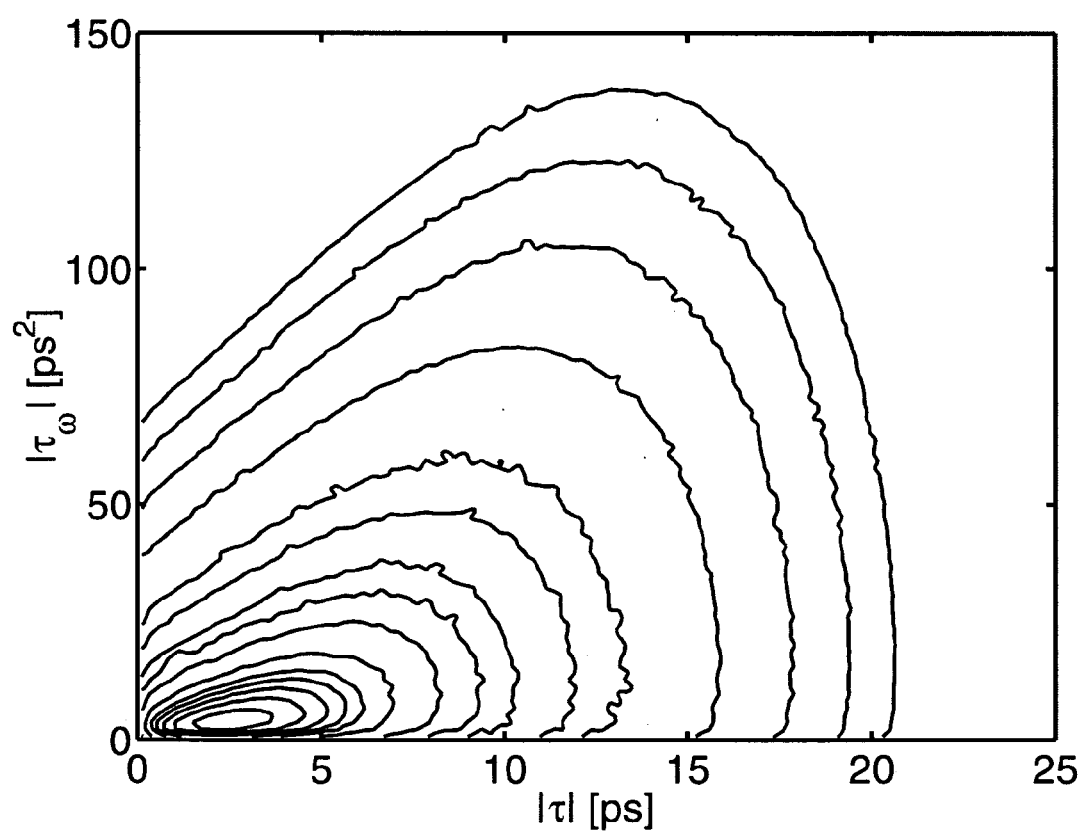
FIG. 8 illustrates contour plots of the joint pdf for a concatenation of 50 sections with 0.5 ps DGD each and polarization scramblers.

FIG. 8 shows contour plots of the joint pdf of the magnitude of first- and second-order PMD for a concatenation of fifty sections with 0.5 ps DGD each and polarization scramblers, as computed with the multiple biasing technique. The contours are at $10^{-n}$ with n=30, 25, 20, 15, 10, 8, 6, 5, 4, 3, 2.5, 2.25, 2, 1.75 and 1.5. A total of $4\times10^6$ Monte-Carlo realizations were used.

As a sample, we illustrate the choice of biasing angles and strengths which were used to produce FIG. 8. The final biasing angles were $\beta_N=0$, $\pi/4$, $\pi/2$, $3\pi/4$, $\pi$; for each value of $\beta_N$, all the following biasing strengths were used: $\alpha=1, 2, 4, 8$. The angle $\delta_N$ was kept zero throughout. Of course, the method described herein is not limited to this particular choice of parameters.

Figure 9:
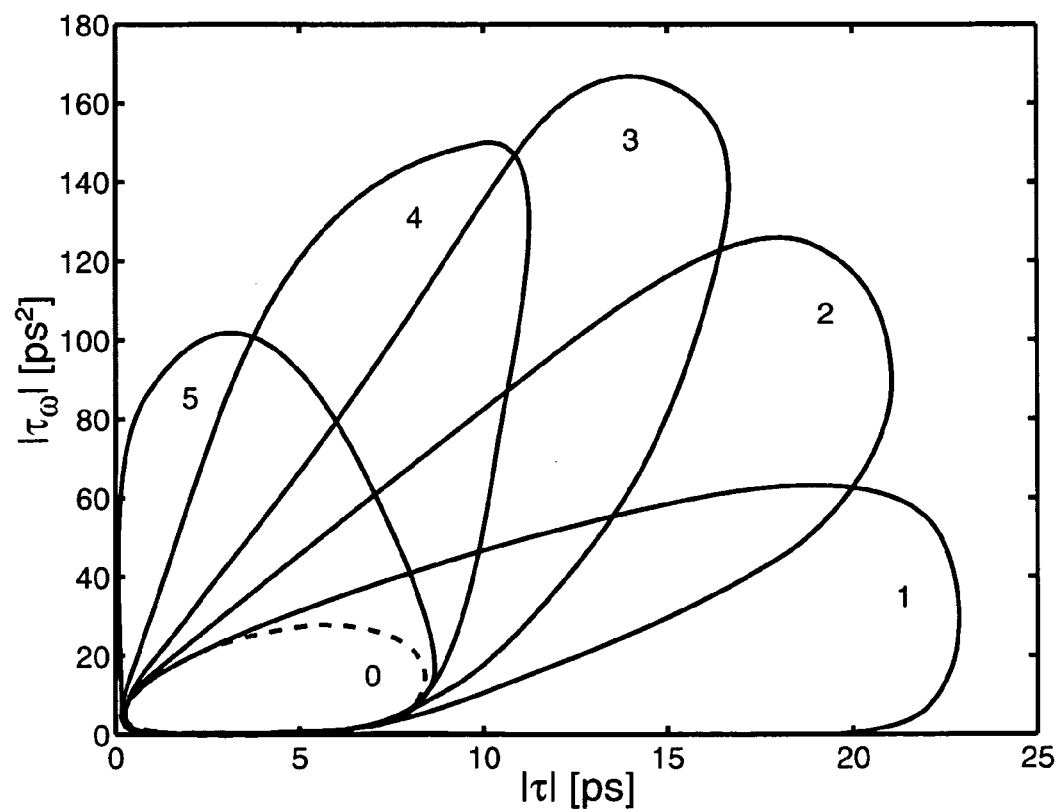
FIG. 9 shows the regions of the $\tau, \tau_\omega$ (i.e., $|\vec{\tau}|, |\vec{\tau}_\omega|$) plane targeted by the various biasing methods used to produce the contour plots of FIG. 8.

FIG. 9 shows the specific regions of the $\tau,\tau_\omega$ plane targeted by specific choices of biasing angle to produce the contour plots of FIG. 8. Region 1 corresponds to first-order biasing ($\beta_N=0$), region 3 to pure second-order biasing ($\beta_N=\pi/2$), and regions 2, 4 and 5 to $\beta_N=\pi/4$, $3\pi/4$ and $\pi$, respectively. For all regions, $\delta^{(n)}=0$. The dashed line shows the region obtained with unbiased runs, showing the definite advantages of using the multiple biasing. Of course, any PMD generator consisting of a finite number of fixed-length sections has a limited range of values for both $\tau$ and $\tau_\omega$ (cf. FIGS. 7A–7C), and therefore it will have unallowed regions in the $\tau,\tau_\omega$ plane (cf. FIG. 7A). These regions are beyond the reach of any biasing strategy, and they can only be accessed only by a PMD generator with a larger number of sections.

Applications

The most immediate commercial application of the above methods #1A and #1B is as an efficient computational algorithm for polarization mode dispersion in a more comprehensive optical simulation package. In addition, methods #1 and #1B can be implemented in hardware. One application of the methods in a device is as part of a control mechanism for a PMD emulator, which is a device that generates PMD in a controllable way. The purpose of a PMD emulator is to simulate the PMD behavior of an optical fiber, so that other devices and systems can be tested to see how they perform under realistic PMD conditions.

One such particular application of a PMD emulator is as a method of testing PMD compensators, devices designed to mitigate the effects of PMD in optical transmission systems. As a result, companies interested in PMD compensation have the potential of being interested in the method described here.

FIG. 10 is a schematic representation of a PMD emulator using a concatenation of aligned birefringent sections 62 with a polarization mode-mixing element 64 interposed between each pair of adjacent sections. An input beam 60 propagates sequentially through each of the birefringent sections producing an output optical beam 66. The polarization mode-mixing element can include a polarization scrambler when the control is provided by the algorithm of method #1A. Alternatively, a rotatable connector can be used to interconnect the sections 62 when the control is provided by the algorithm of method #1B. Implementing methods #1A and #1B which have been described for controlling the generation of first- and second-order in a PMD emulator requires the resolution of some practical issues, which has been done. The main issue is that the methods require knowledge of the first- and second-order polarization dispersion vectors after each birefringent segment, so that the next birefringent segment can be optimally oriented. It has been shown that it is possible to construct an emulator of birefringent materials that have been sufficiently characterized and stabilized so that the polarization dispersion vectors are determined if the orientation of the birefringent elements comprising the emulator are known. Examples of emulators that are sufficiently stable to allow this approach are disclosed in United States Patent Applications serial Nos. 2002/0118455 A1, and 2002/0191285 A1, for example, which patent applications are incorporated herein by reference.

Method #2

A second method #2 for the generation of PMD results when the birefringent sections are allowed to have variable differential group delays (DGDs). In this case, randomness arises not only from the polarization scramblers between each birefringent section, but also from the changing DGDs. One particularly interesting model consists of a concatenation of sections with Maxwellian-distributed lengths, connected by polarization controllers. Compared to other PMD emulation schemes, it offers significant advantages: the DGD generated with this scheme has the exact Maxwellian distribution for any number of sections. Note that Maxwellian-distributed lengths result when each component of $\Delta \vec{\tau}_{n+1}$ is an independent Gaussian-distributed random variable (RV) with mean zero and variance $\sigma^2$, where $\sigma$ is some fixed constant. This is because the square root of the sum of the squares of three independent, identically-distributed Gaussian random variables has a Maxwellian distribution.

Importance sampling can be added to this scheme to make a highly-efficient PMD generation method. The probability density function (pdf) of the emulator configurations can be expressed as $$p(\Delta\vec{\tau}^{(1)}, \ldots, \Delta\vec{\tau}^{(N)}) = \frac{1}{(\sqrt{2\pi}\,\sigma)^{3N}} \exp\left\{-\sum_{n=1}^{N} |\Delta\vec{\tau}_n|^2/2\sigma^2\right\},$$

where N is the total number of sections. The first step to developing an optimized form of importance sampling is to determine the most probable configurations that produce a given value of first- and/or second-order PMD. The simpler case of the DGD is considered first and then, the case of any combination of first- and second-order PMD (SOPMD) is considered.

As with methods #1A and #1B previously described, the contributions of the (n+1)-st section to the overall PMD are described with respect to the reference frame $\mathcal{u}^{(n)} = \{\hat{u}_1^{(n)}, \hat{u}_2^{(n)}, \hat{u}_3^{(n)}\}$, where $\hat{u}_1^{(n)}$ is aligned with $\vec{\tau}^{(n)}$, $\hat{u}_2^{(n)}$ with $\vec{\tau}^{\omega,\perp(n)}$ (the depolarization) and $\hat{u}_3^{(n)} = \hat{u}_1^{(n)} \times \hat{u}_2^{(n)}$. To maximize the total probability of obtaining a given total DGD, i.e. $|\vec{\tau}^{(N)}| = |\Sigma_{n=1}^{N} \Delta\vec{\tau}_n|$, it is necessary to minimize $\Sigma_{n=1}^{N} |\Delta\vec{\tau}_n|^2$ with DGD=const. The solution to this problem, in terms of the local coordinate systems $\mathcal{u}^{(n)}$, is $\Delta\vec{\tau}_{n+1} = \vec{b}^{(n)}$, where $\vec{b}^{(n)} = \Delta\tau \hat{u}_1^{(n)}$, and $\Delta\tau = DGD/N$. In other words, the configuration that maximizes the probability of obtaining a given DGD is that of equal length sections, each aligned with the total PMD vector up to that point. This is essentially the solution found in method #1A as previously described; in this context, however, it means that: i) equal DGD sections are the ones that maximize the probability, and ii) the optimum DGD per section, $\Delta\tau$, is now determined by the target DGD being sought: $\Delta\tau$=DGD/N.

The case of second-order PMD (SOPMD) is a bit more complicated. The continuum limit of the first two concatenation equations is, as before:

$$\frac{d\vec{\tau}}{dz} = b_1, \quad \frac{d\tau_{\omega,\perp}}{dz} = b_3\tau - b_2\frac{\tau_{\omega,\parallel}}{\tau}, \quad \frac{d\tau_{\omega,\parallel}}{dz} = b_2\frac{\tau_{\omega,\perp}}{\tau}, \quad (21)$$

where $\vec{b}(z) = \lim_{\Delta z \to 0} \Delta\vec{\tau}/\Delta z$ and $(b_1, b_2, b_3)$ are the components of $\vec{b}(z)$ with respect to $\mathcal{u}$. Again, these equations have the exact solution:

$$\tau(L) = \int_0^L b_1(z)dz, \quad (22a)$$

$$\tau_{\omega,\perp}(L) = \int_0^L b_3(z)\tau(z)\cos B(L,z)dz, \quad (22b)$$

$$\tau_{\omega,\parallel}(L) = \int_0^L b_3(z)\tau(z)\sin B(L,z)dz, \quad (22c)$$

where, as before, integrals have replaced sums, and where $B(L,z) = \int_z^L b_2(z')/\tau(z')dz'$. Maximum probability configurations are obtained by minimizing $\int_0^L b^2(z)dz$, where $b^2(z) = |\vec{b}(z)|^2 = b_1^2(z) + b_2^2(z) + b_3^2(z)$. As described previously, the polarization-dependent chromatic dispersion is much smaller than the depolarization, so working with the SOPMD is, to first approximation, equivalent to working with the depolarization. Thus, the goal is to minimize the above integral subject to the constraint of having a given linear combination of DGD and depolarization. Using calculus of variations, the solution is:

$$b_1(z) = \Delta\tau\cos(\beta z/L), \; b_2(z) = 0, \; b_3(z) = \Delta\tau\sin(\beta z/L), \quad (23)$$

where $\beta$ ranges between 0 and $\pi$, depending upon the particular linear combination of DGD and SOPMD that is desired. This is the solution found in method #1 as previously described except that: i) equal length sections maximize the probability of obtaining this combination of DGD and SOPMD, and ii) $\Delta\tau$ is also a parameter, related with $\beta$ to the final amount of DGD and SOPMD sought. Specifically, $$DGD_{final} = N\Delta\tau \frac{\sin\beta}{\beta}, \quad (24a)$$

$$SOPMD_{final} = (N\Delta\tau)^2 \frac{2\beta - \sin 2\beta}{4\beta^2}, \quad (24b)$$

where we have taken $\Delta z=1$ and $L=N$. These equations are very similar to Equations (20), and describe how to choose the parameters $\Delta\tau$ and $\beta$ so that a particular DGD and SOPMD is targeted.

Once the above continuous version of the configurations $\vec{b}(z)$ that maximize the probability have been found, the solution guides the discrete concatenation equations. Specifically, biased distributions are chosen that randomly select samples for each section's PMD vector, $\Delta\vec{\tau}_{n+1}$, that are preferentially close to the optimal $\vec{b}^{(n)} \approx \vec{b}(n)$, so that many Monte-Carlo (MC) trials fall in the desired regions of configuration space. The simplest way to do this is to take the components of $\Delta\vec{\tau}_{n+1}$ to be independent, identically distributed (i.i.d.) Gaussian RVs with variance $\sigma^2$ and means equal to the components of $\vec{b}^{(n)}$. The probabilities are then adjusted for the biasing in the standard manner using the likelihood ratios:

$$L(\Delta\vec{\tau}^{(1)}, \ldots, \Delta\vec{\tau}^{(N)}) = \exp\left\{-\sum_{n=1}^{N}\left(\left|\Delta\vec{\tau}^{(n)}\right|^2 - \left|\Delta\vec{\tau}^{(n)} - \vec{b}^{(n-1)}\right|^2\right)/2\sigma^2\right\}.$$

One method of the generation and emulation of first- and second-order PMD using a concatenation of birefringent elements or sections with variable-length sections with polarization scramblers, is referred to as method #2. Method #2 is similar to method 1A, the flow diagram of which is shown in FIG. 4. However, the biasing parameters now include a set of values of $\Delta\tau$. Also, in step 31, the final biasing angles and strengths are mapped to the final first- and second-order PMD values with Equations (24a–24b).

In step 36, for method 2, the components of $\vec{b}^{(n)}$ are $\Delta\tau\cos\beta^{(n)}\cos\delta^{(n)}, \Delta\tau\sin\delta^{(n)}, \Delta\tau\sin\beta^{(n)}\cos\delta^{(n)}$, where N is the total number of sections, $\beta^{(n)}$ and $\delta^{(n)}$ are determined in terms of the final biasing angles selected in step 32 and $\Delta\tau$ is the biasing strength selected in step 32.

In step 37, for method 2, the length and orientation of the next birefringent section are selected so that its PMD vector is equal to the sum of the biasing vector $\vec{b}^{(n)}$ plus a vector the components of which are independent, identically distributed, zero mean Gaussian random variables with variance $\sigma^2$.

The remaining steps 32–35 and 38–42 are common to methods #1A and #2.

Figure 11:
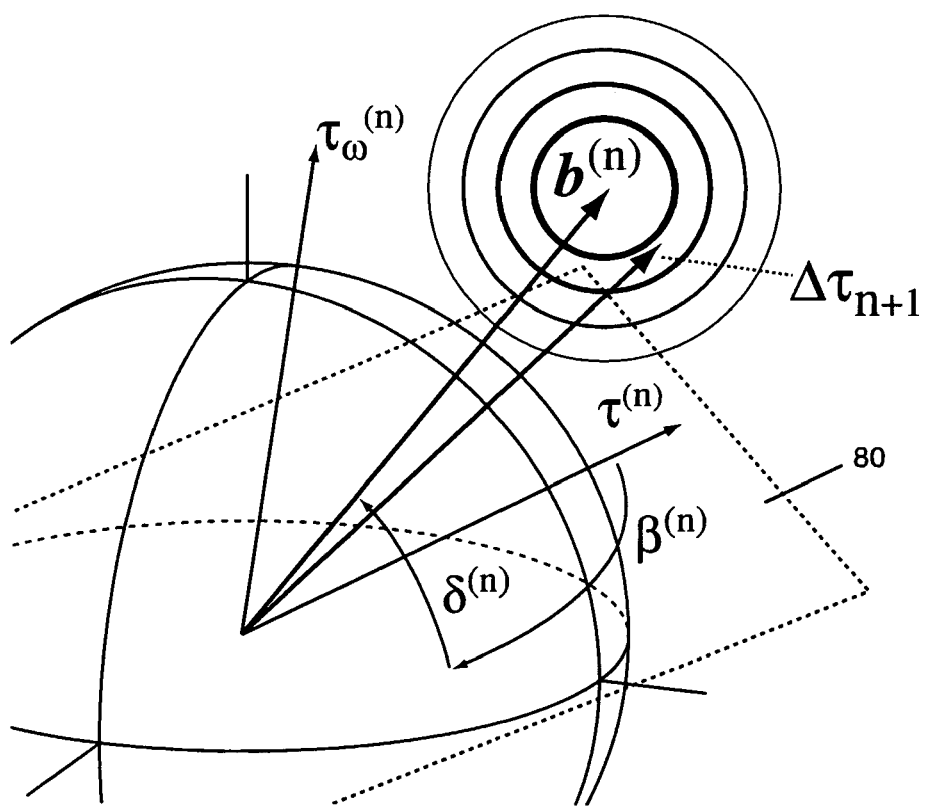
FIG. 11 illustrates a next section selection process for PMD generation using variable length birefringent sections interconnected by polarization scramblers.

The following is a description of the process for determining the length and orientation of the next birefringent section for PMD generation using variable-length birefringent sections connected by polarization scramblers, in accordance with method #2. Referring to FIG. 11, first find the plane formed by the unit vectors $\hat{u}_1^{(n)}$ and $\hat{u}_3^{(n)}$. The vectors $\vec{\tau}^{(n)}$ (this is proportional to $\hat{u}_1^{(n)}$) and $\vec{\tau}^{(n)} \times \vec{\tau}_\omega^{(n)}$ (proportional to $\hat{u}_3^{(n)}$) will lie in this plane. Using the using the computed angles $\beta^{(n)}$ and $\delta^{(n)}$, determine the biasing vector $\vec{b}^{(n)}$. Choose the length and orientation of the next birefringent section so that its PMD vector $\Delta\vec{\tau}_{n+1}$ is equal to the sum of the biasing vector $\vec{b}^{(n)}$ plus a vector whose components are independent, identically distributed, zero mean Gaussian random variables with variance $\sigma^2$. This completes the process of determining the length and orientation of the next birefringent section for this algorithm.

Variable-length PMD generation methods avoid some of the problems associated with fixed-length PMD emulators. First of all, for fixed length emulators, the best agreement between the generated pdfs of DGD and SOPMD with those for real fiber is always best when the lengths are all equal. Using equal length sections is not advisable, though, because of the artificial periodicities introduced in the frequency autocorrelation function (ACF) of the PMD vector. With Maxwellian lengths are used, however, the actual section lengths are RVs, and it is only the means of the section lengths that are equal. As a result, the periodicities of the ACF are avoided (because true periodicity only occurs for exactly equal-length sections) while maintaining good agreement between the generated and true pdfs.

Sample Results

Figure 12:
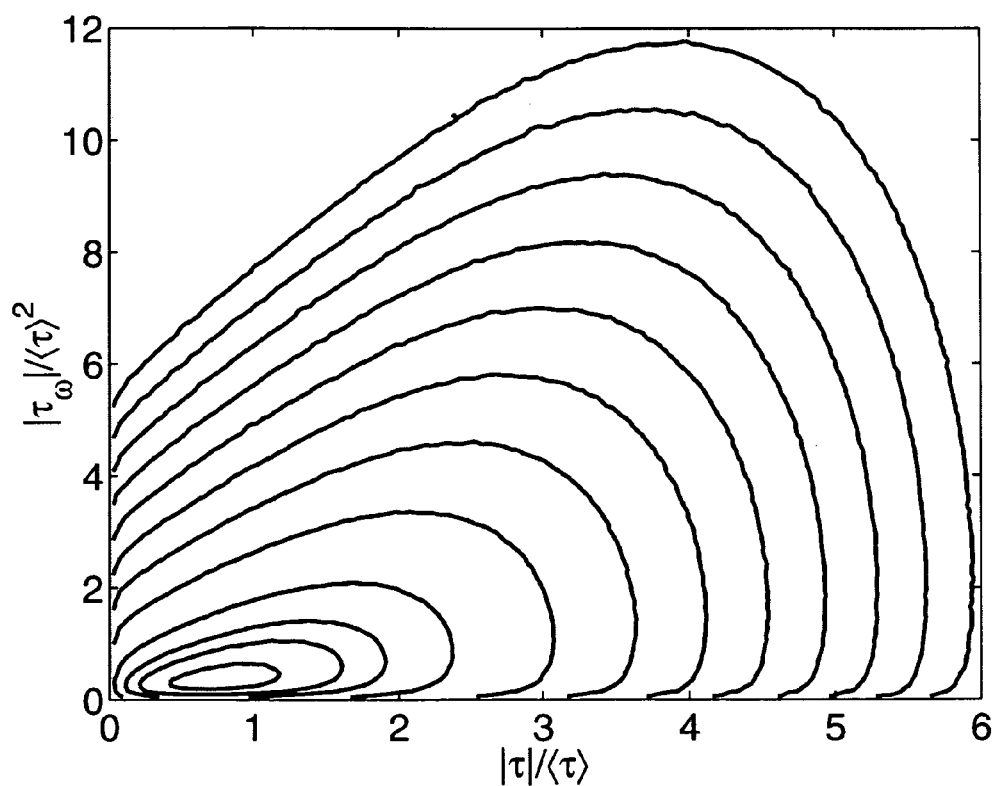
FIG. 12 shows the contour plots of the joint pdf for a catenation of 200 sections normalized so that $<\tau>=1$ using polarization scramblers and Maxwellian-distributed section lengths.

FIG. 12 shows contour plots of the joint pdf of the first- and second-order PMD for the case of polarization scramblers as computed using importance sampling with Maxwellian-distributed sections. It should be noticed that the curves are much smoother than those shown in FIG. 8. The biggest reason for the improvement in the smoothness of the curves is the additional randomness that results from using variable length sections. The contour plots shown in FIG. 12 are those of the joint pdf for a concatenation of 200 sections normalized so that $\langle\tau\rangle=1$ using polarization scramblers and Maxwellian-distributed section lengths. The contours are at $10^{-n}$ with n=18, 16, 14, 12, 10, 8, 6, 4, 2, 1, 0.5 and 0. A total of $10^6$ Monte-Carlo realizations were used.

Applications

One commercial application of method #2 is as an efficient computational algorithm for polarization mode dispersion in a more comprehensive optical simulation package. Method #2 is likely to be easier to implement in software than the algorithm of methods #1A and #1B.

Hardware implementation of this algorithm is requires a variable PMD element that is completely characterized, stable, and is repeatable. A fast digital variable DGD element has been constructed using polarization switching.

Method #3

A modification of method #2 described above involves the use of importance sampling with Maxwellian-distributed sections which can be used in a way that targets specific differential group delay (DGD) values. Method #3 produces configurations of sections that yield DGDs narrowly concentrated around a prescribed target, while at the same time producing a wide range of second-order (and higher) PMD values. It thus provides an efficient method for generating second-order PMD (SOPMD) at a given DGD.

As described above in method #2, the biasing of the Maxwellian-distributed PMD vector associated with each section is taken to be $\Delta\vec{\tau}_{n+1} = \vec{b}^{(n)}$, with $\vec{b}^{(n)} = \Delta\tau_{n+1}\hat{u}_1^{(n)\oplus}$, where $\hat{u}_1^{(n)}$ is the unit vector pointing in the direction of the total PMD vector of the previous n sections, $\vec{\tau}^{(n)}$. Rather than selecting the biasing a priori, however, the length of each section is biased by an amount proportional to the difference between the target DGD and the total DGD accumulated from the previous sections. Specifically, $$\Delta\tau_{n+1} = \frac{DGD_{final} - \tau^{(n)}}{N-n}.$$

As with method #2, the biasing is done by randomly selecting the components of section's PMD vector, $\Delta\vec{\tau}_{n+1}$, from Gaussian distributions, with means equal to the components of $\vec{b}^{(n)} = \Delta\tau_{n+1}\hat{u}_1^{(n)}$. The probabilities are again adjusted for the biasing in the standard manner using the likelihood ratios. In this case, however, the biasing is done toward a specific DGD value.

One method of the generation and emulation of targeted amounts of DGD using a concatenation of birefringent elements or sections with variable-length sections with polarization scramblers, is referred to as method #3.

Figure 13:
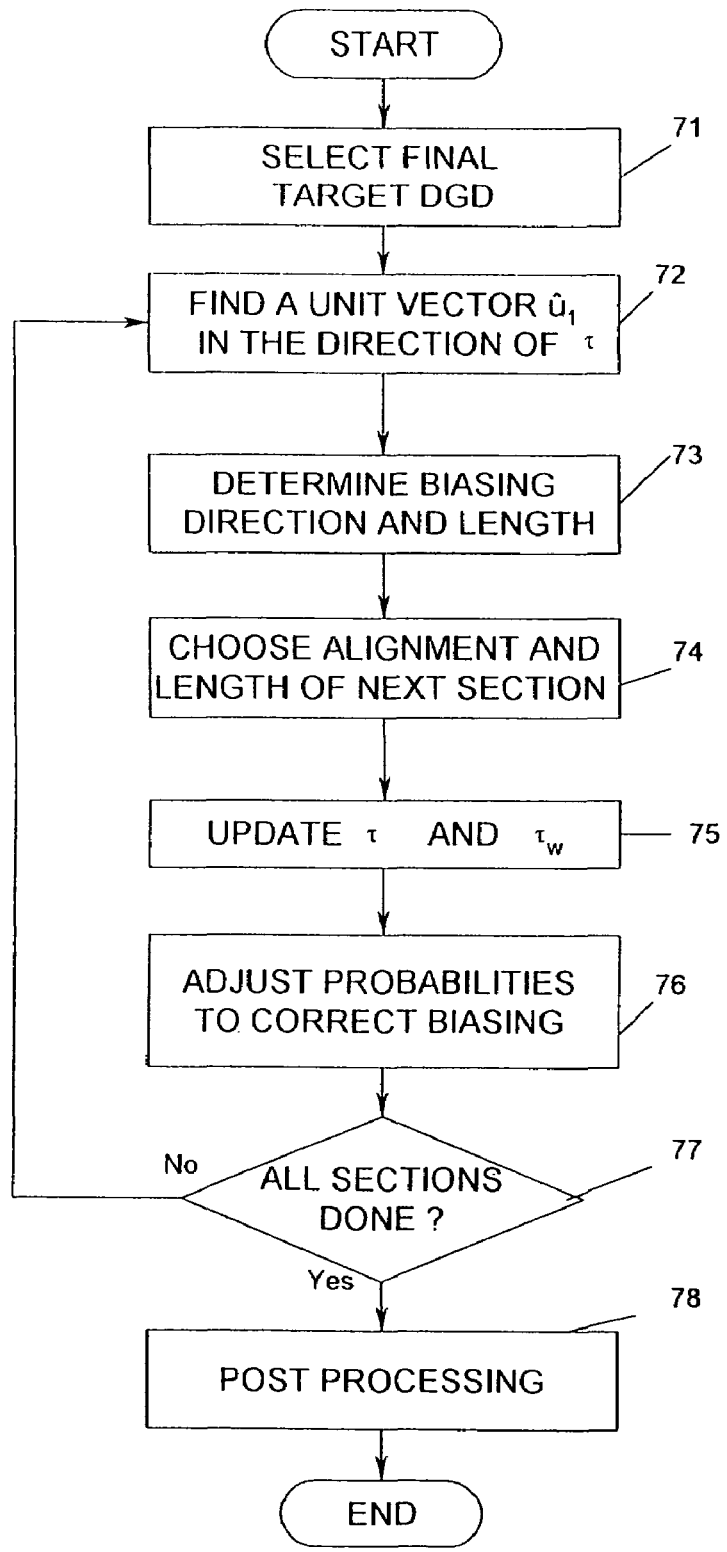
FIG. 13 is a flow diagram for a further method of producing PMD in accordance with the present invention.

More specifically, with reference to FIG. 13, the steps of the method #1 are as follows.

In step 71, a final target DGD value, $DGD_T$ is chosen.

In step 72, the unit vector $\hat{u}_1^{(n)}$ in the same direction as $\vec{\tau}^{(n)}$ is found.

In step 73, a biasing vector $\vec{b}^{(n)} = (DGD_T - |\vec{\tau}^{(n)}|)/(N-n+1)$ is chosen.

In step 74, the alignment of the next section is chosen. Here, the length and orientation of the next birefringent section are chosen so that so that its PMD vector is equal to the sum of the biasing vector $\vec{b}^{(n)}$ and a vector whose components are independent, identically distributed, zero mean Gaussian random variables with variance $\sigma^2$.

In step 75, the PMD vector and its frequency derivative are updated using the PMD concatenation equations as described herein.

In step 76, the probabilities are updated using the importance sampling likelihood ratios as described herein.

Step 77 determines if all of the sections are done. If not, flow returns to step 72, otherwise flow proceeds to step 78. Step 78 carries out any post-processing, if necessary, such as constructing histograms of data generated by the method.

The following description illustrates the PMD generation algorithm for targeted PMD generation using variable length sections and polarization scramblers in accordance with method #3. Referring to FIG. 11, first the unit vector $\hat{u}_1^{(n)}$ is found (the vector $\vec{\tau}^{(n)}$ is proportional to $\hat{u}_1^{(n)}$). The biasing vector $\vec{b}^{(n)}$ is then chosen to be parallel to $\hat{u}_1^{(n)}$ (this is equivalent to choosing $\beta^{(n)}=0$ and $\delta^{(n)}=0$). The length of the biasing vector $\vec{b}^{(n)}$ is chosen to be the ratio of the difference between the target DGD value and the current DGD value (the length of the vector $\vec{\tau}^{(n)}$) and the remaining number of sections. If the difference between the DGD target value and the current DGD value is negative, multiply the biasing vector by −1, so that it points in the direction opposite to $\vec{\tau}^{(n)}$. Choose the length and orientation of the next birefringent section so that its PMD vector is equal to the biasing vector $\vec{b}^{(n)}$ plus a vector whose components are independent, identically distributed, zero mean Gaussian random variables.

Sample Results

Figure 14:
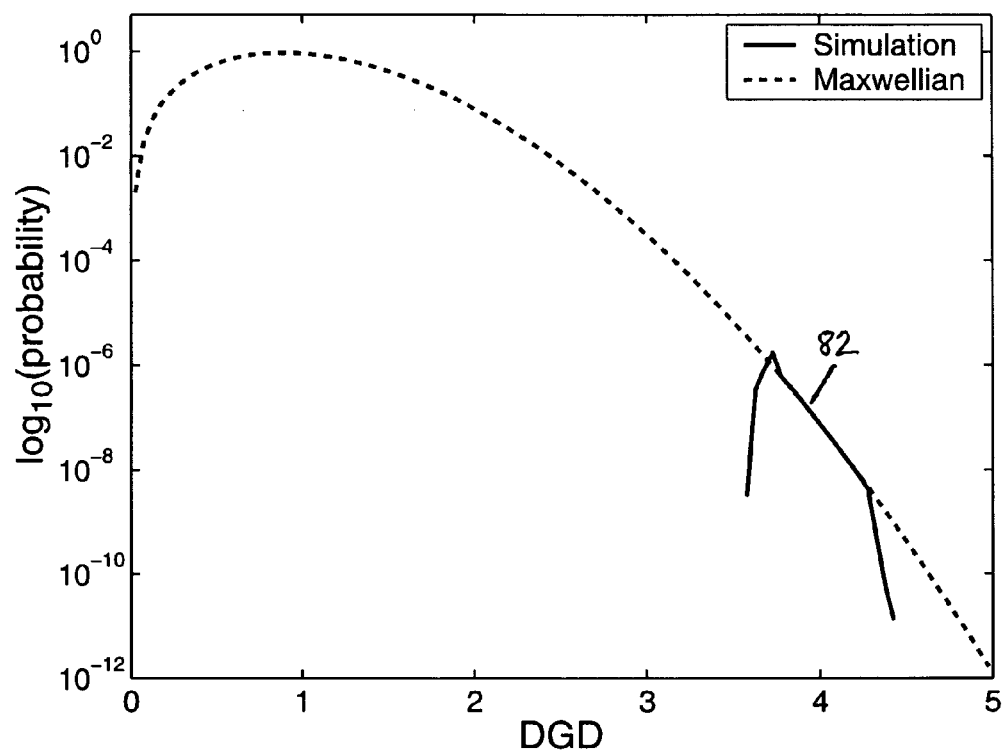
FIG. 14 shows the DGD distribution for 50 Maxwellian-distributed birefringent sections using targeted importance sampling.
Figure 15:
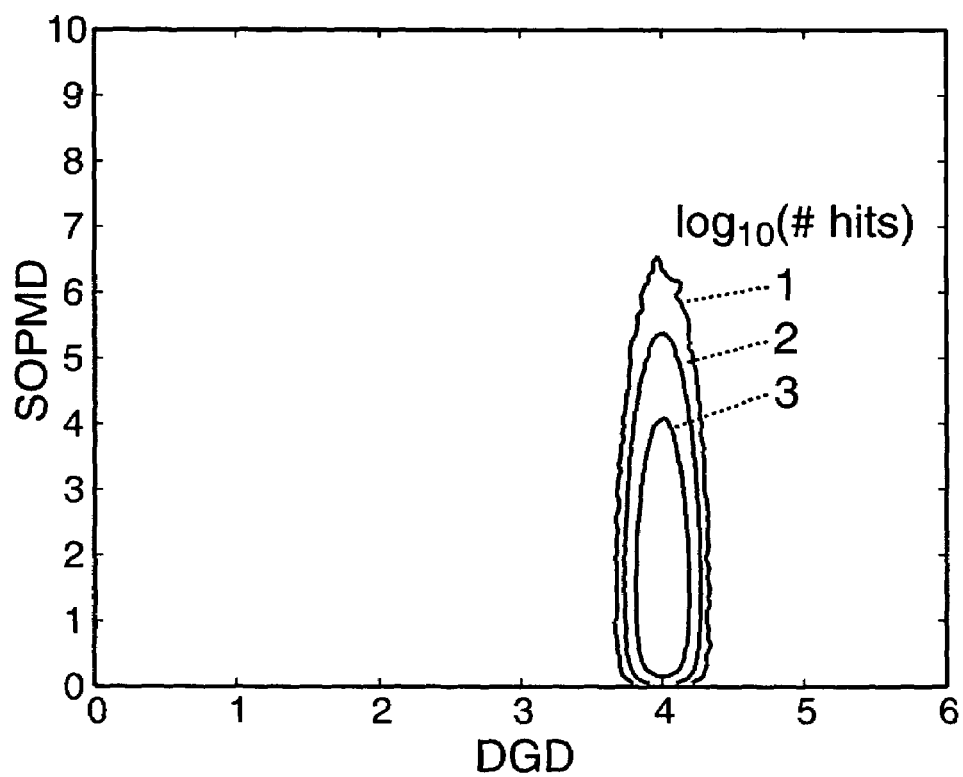
FIG. 15 is a histogram showing the density of importance-sampled Monte-Carlo samples.

FIG. 14 shows that the computed DGD probability distribution function (pdf) from a targeted importance-sampled (IS) Monte-Carlo (MC) simulation is in excellent agreement with the theoretical Maxwellian distribution around the selected target, i.e., for DGD=4. As shown in FIG. 14, virtually all samples fall in a narrow range 82 around the target value, even though the probability of these events occurring in an unbiased simulation is quite small. The density histogram of the biased samples of the targeted IS MC simulation, shown in FIG. 15, clearly shows that all of the trials have DGDs narrowly distributed around the prescribed target, but also that they span a wide range of SOPMD values. The conditional pdf of the SOPMD at the target DGD value of four given in FIG. 16 also shows a wide range of SOPMD values. The main graph has a logarithmic scale and the inset has a linear scale.

Applications

This variable length method can be easily implemented in software; it is a slight modification of method #2, with only one biasing direction selected and the means of the variable length sections adjusted as the simulation progresses. A hardware device capable of using method #2 can also implement the algorithm of method #3.

General Considerations

The following is additional information about updating the PMD vector and its frequency derivative, applicable to all methods described herein. The PMD concatenation equations are frequency dependent. By doing the biasing in the manner described above at one particular frequency, but keeping track of the frequency dependence properly in the concatenation equation (primarily in the Müller rotation matrices), simulations can be constructed that produce first- and second-order PMD across a range of frequencies. In the PMD concatenation equations, the Mueller rotation matrix associated with a linearly birefringent section rotates the total PMD vector up to that point about an axis parallel to the section's PMD vector. The rotation angle has two terms: one proportional to the product of the section's DGD and the optical frequency, and another term that is independent of frequency; both are also proportional to the length of the birefringent section. Each must be specified when the concatenation is being simulated. The way the frequency-independent term should be handled depends upon the manner of PMD generation being employed. If polarization scramblers are used, they add a random frequency-independent rotation; the net frequency-independent rotation is then uniformly distributed from 0 to $2\pi$. If rotatable connectors are used, then the frequency-independent rotation comes from whatever such rotation the birefringent elements possess. A set of angles, one for each section, can be chosen randomly if there is no reason to pick specific values. If method #2 is used to control a hardware PMD emulator, the values of the frequency-independent angles associated with each section need to be known. This can be done by constructing a coherent PMD emulator as described in the United States Patent Applications 2002/0118455A1 and 2002/0191285A1 referenced above.

Regarding off-plane biasing for PCD, reasonable results for the polarization-dependent chromatic dispersion (PCD) are obtained by biasing using a final biasing angle $\beta_N$ equal to $\pi/2$, while taking $\delta^{(n)}=0$. This generates small first-order PMD and relatively large second-order PMD. The statistics can be further improved by using the power-law off-plane biasing as described herein. With the exception of this last biasing method for PCD, in the exemplary embodiments, all of the biasing schemes use $\delta^{(n)}=0$. However, a fuller range of biasing directions can be used to accomplish additional goals.

It should be noted that, although the methods described herein specifically target first- and second-order PMD, large amounts of third- and higher-orders of PMD are also produced.

It should also be noted that, although other physical effects such as dispersion and nonlinearity are not explicitly discussed here, the algorithms described herein can obviously be used in simulations of optical systems where those effects are included.

Finally, although an exemplary embodiment of the present invention has been shown and described with reference to particular embodiments and applications thereof, it will be apparent to those having ordinary skill in the art that a number of changes, modifications, or alterations to the invention as described herein can be made, none of which depart from the spirit or scope of the present invention. All such changes, modifications, and alterations should therefore be seen as being within the scope of the present invention.

What is claimed is:

1. A method for producing polarization mode dispersion (PMD) in a controlled manner, by specifying amounts of first and second order PMD, including, in particular, large amounts of first and second order PMD, using a concatenation of birefringent elements or sections, said method comprising the steps of:
   (a) aligning the birefringent elements or sections with respect to one another;
   (b) determining at least a PMD vector for each birefringent element or section;
   (c) determining at least a total PMD vector and the frequency derivative of the PMD vector for a number of said birefringent elements or sections that are connected together;
   (d) orienting a next birefringent element or section so that its PMD vector is properly aligned with respect to said total PMD vector and the frequency derivative of the PMD vector;
   (e) updating at least the total PMD vector and the frequency derivative of the PMD vector; and
   (f) repeating steps (b) through (e) for a plurality of birefringent elements or sections of the concatenation of birefringent elements or sections.

2. The method according to claim 1, including using a continuum approximation of PMD concatenation equations to determine a biasing direction to be used to make a proper alignment of the birefringement elements or sections.

3. The method according to claim 1, wherein the birefringent elements or sections are fixed length.

4. The method according to claim 1, wherein the birefringement elements or sections have variable length.

5. The method according to claim 4, wherein the lengths of the birefringement elements or sections are chosen to obtain a specific target value of differential group delay (DGD), or specific values of first- and second-order PMD.

6. The method according to claim 1, including using biasing probability distributions to randomly select the orientation of said next birefringent element or section for Monte-Carlo simulations so that large amounts of at least first- and second-order PMD values are obtained, and producing desired PMD or PMD-induced statistics using a plurality of biasing parameters.

7. The method according to claim 6, including using a plurality of sets of biasing parameters.

8. The method according to claim 6, and including the step of using likelihood ratios and importance sampling to correct the probabilities for the biasing of probability distributions using a set of biasing parameters.

9. The method according to claim 6, and including the step of using likelihood ratios and weights of multiple importance sampling to correct the probabilities for the biasing of probability distributions using a plurality of sets of biasing parameters.

10. A method for producing polarization mode dispersion (PMD) in a controlled manner, by specifying a desired amount of first-order PMD, including, in particular, large amounts of first-order PMD, using a concatenation of birefringent elements or sections, said method comprising the steps of:
    (a) aligning the birefringent elements or sections with respect to one another;
    (b) determining at least a PMD vector for each birefringent element or section;
    (c) determining at least a total PMD vector for a number of said birefringent elements or sections that are connected together;
    (d) orienting a next birefringent element or section so that its PMD vector is properly aligned with respect to said total PMD vector, and choosing the next birefringent element or section's length based upon the length of the total PMD vector of the previous sections and the target value;
    (e) updating at least the total PMD vector;
    (f) repeating steps (b) through (e) for a plurality of birefringent elements or sections of the concatenation of birefringent elements or sections.

11. The method according to claim 10, including using a plurality of sets of biasing parameters.

12. The method according to claim 10, including using biasing probability distributions to randomly select the orientation of said next birefringent element or section for Monte-Carlo simulations so that large amounts of at least first- and second-order PMD_values are obtained, and producing desired PMD or PMD-induced statistics using a plurality of biasing parameters.

13. The method according to claim 12, and including the step of using likelihood ratios and importance sampling to correct the probabilities for the biasing of probability distributions using a set of biasing parameters.

14. A method for producing polarization mode dispersion (PMD) in a controlled manner, by specifying amounts of first and second order PMD, including, in particular, large amounts of first and second order PMD, using a concatenation of birefringent elements or sections, said method comprising the steps of:
    (a) aligning the birefringent elements or sections with respect to one another;
    (b) determining at least a PMD vector for each birefringent element or section;
    (c) determining at least a total PMD vector and the frequency derivative of the PMD vector for a number of said birefringent elements or sections that are connected together;
    (d) orienting a next birefringent element or section so that its PMD vector is properly aligned with respect to said total PMD vector and the frequency derivative of the PMD vector;
    (e) biasing probability distributions used to randomly select the orientation of said next section for Monte-Carlo simulations so that large amounts of at least first- and second-order PMD values are obtained;
    (f) using likelihood ratios and weights of importance sampling to correct the probabilities for the biasing of probability distributions using a plurality of sets of biasing parameters;
    (g) updating at least the total PMD vector and the frequency derivative of the PMD vector;
    (h) repeating steps (b) through (f) for a plurality of birefringent elements or sections of the concatenation of birefringent elements or sections; and
    (i) producing desired PMD or PMD-induced statistics using a plurality of biasing parameters.

15. The method according to claim 14, wherein the birefringent elements or sections are fixed length.

16. The method according to claim 14, wherein the birefringent elements or sections have variable length.

17. The method according to claim 16, wherein the lengths of the birefringent elements or sections are chosen to obtain a specific target value of differential group delay (DGD), or specific values of first and second order PMD.

18. The method according to claim 14, including using a continuum approximation of PMD concatenation equations to determine a biasing direction to be used to make a proper alignment of the birefringement elements or sections.

19. The method according to claim 18, wherein the step of biasing probability distributions includes the steps of selecting a biasing strength and selecting a biasing direction.

20. The method according to claim 19, wherein the step of selecting biasing direction includes the step of selecting orientation angles with respect to orthogonal unit vectors determined from the PMD vector and the frequency derivative of the PMD vector.

* * * * *